United States Patent [19]

Warren, II

[11] Patent Number: 4,515,134

[45] Date of Patent: May 7, 1985

[54] MOLECULAR DIFFUSER ASSEMBLY

[76] Inventor: Conrad K. Warren, II, 1401 Quaker St., No. 3, Golden, Colo. 80401

[21] Appl. No.: 339,297

[22] Filed: Jan. 15, 1982

Related U.S. Application Data

[63] Continuation of Ser. No. 134,107, Mar. 26, 1980, abandoned.

[51] Int. Cl.³ .............................................. F02M 31/00
[52] U.S. Cl. ..................... 123/557; 123/549; 261/142
[58] Field of Search ............... 123/557, 558, 527, 549; 261/144, 145, 142; 48/189.2, 180.1

[56] References Cited

U.S. PATENT DOCUMENTS

| | | | |
|---|---|---|---|
| 2,285,915 | 6/1942 | Cunningham | 123/557 |
| 2,306,897 | 12/1942 | Ollig | 123/557 |
| 2,717,827 | 9/1955 | Best | 123/557 |
| 2,896,599 | 7/1959 | Ensign | 123/527 |
| 2,988,075 | 6/1961 | Ensign | 123/557 |
| 3,306,273 | 2/1967 | Dolphin | 123/557 |
| 3,738,334 | 6/1973 | Farr | 123/557 |
| 3,762,378 | 10/1973 | Bitonti | 123/557 |
| 3,963,013 | 6/1976 | Authement | 123/557 |
| 3,968,775 | 7/1976 | Harpman | 123/557 |
| 4,046,120 | 9/1977 | Laprade | 123/527 |
| 4,092,963 | 6/1978 | Vrooman | 123/557 |
| 4,177,778 | 12/1979 | Naitou | 123/557 |

Primary Examiner—Ronald H. Lazarus
Attorney, Agent, or Firm—D. A. N. Chase; Michael Yakimo, Jr.

[57] ABSTRACT

A molecular diffuser assembly is adapted to replace the carburetor of an internal combustion engine and is provided with a venturi-type passageway in communication with the internal combustion engine for drawing an airstream therethrough. A thermistor-type heater-/evaporator assembly operates at a selected temperature to evaporate all the volatile constituents of the liquid fuel introduced thereto and provides a substantially complete vapor fuel for delivery to the venturi for diffusion with the airstream passing therethrough. A regulator assembly controls the amount of vapor fuel discharged into the venturi in response to parametric information delivered thereto, such information indicative of the mass flow rate of the airstream flowing through the venturi. The vaporized fuel in the venturi throat represents the fuel molecules at an optimal degree of separation so as to optimally react with the oxydizing airstream. A mixture control valve is also provided for adjusting the fuel/air ratio so as to compensate for particular fuel enrichment requirements.

12 Claims, 18 Drawing Figures

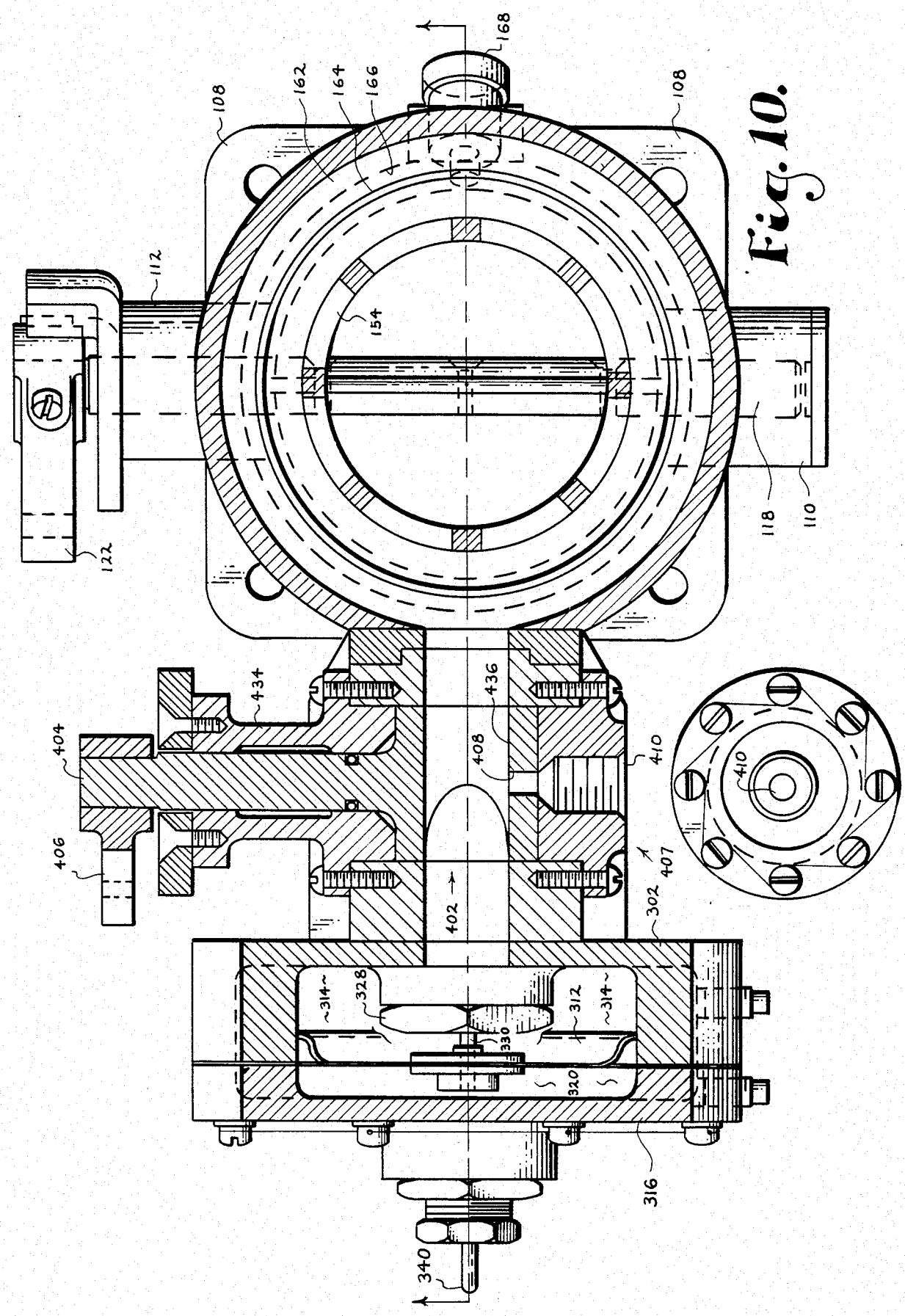

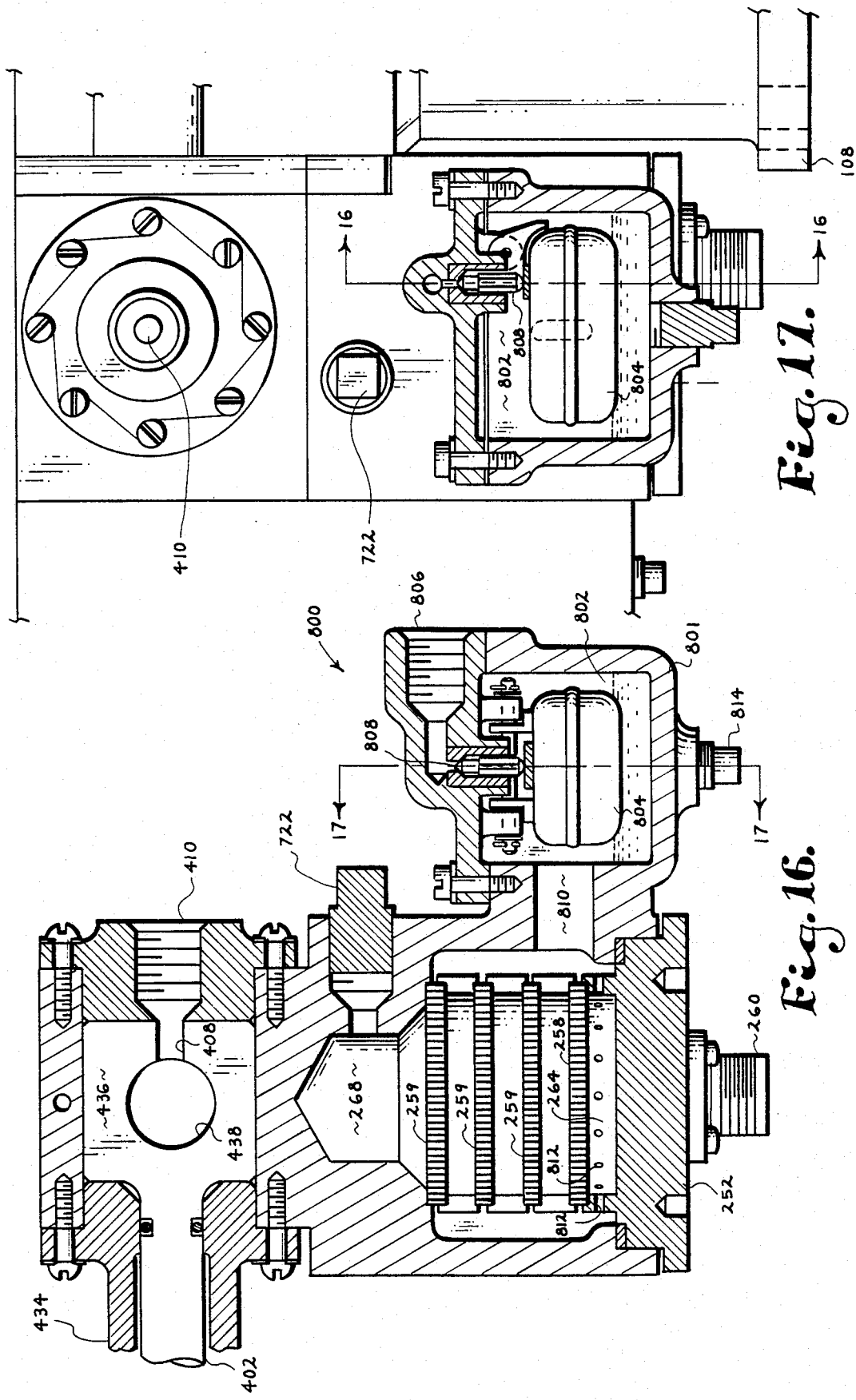

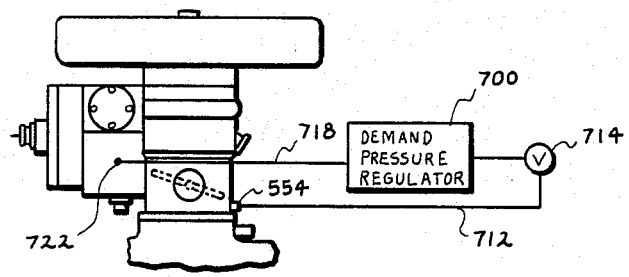
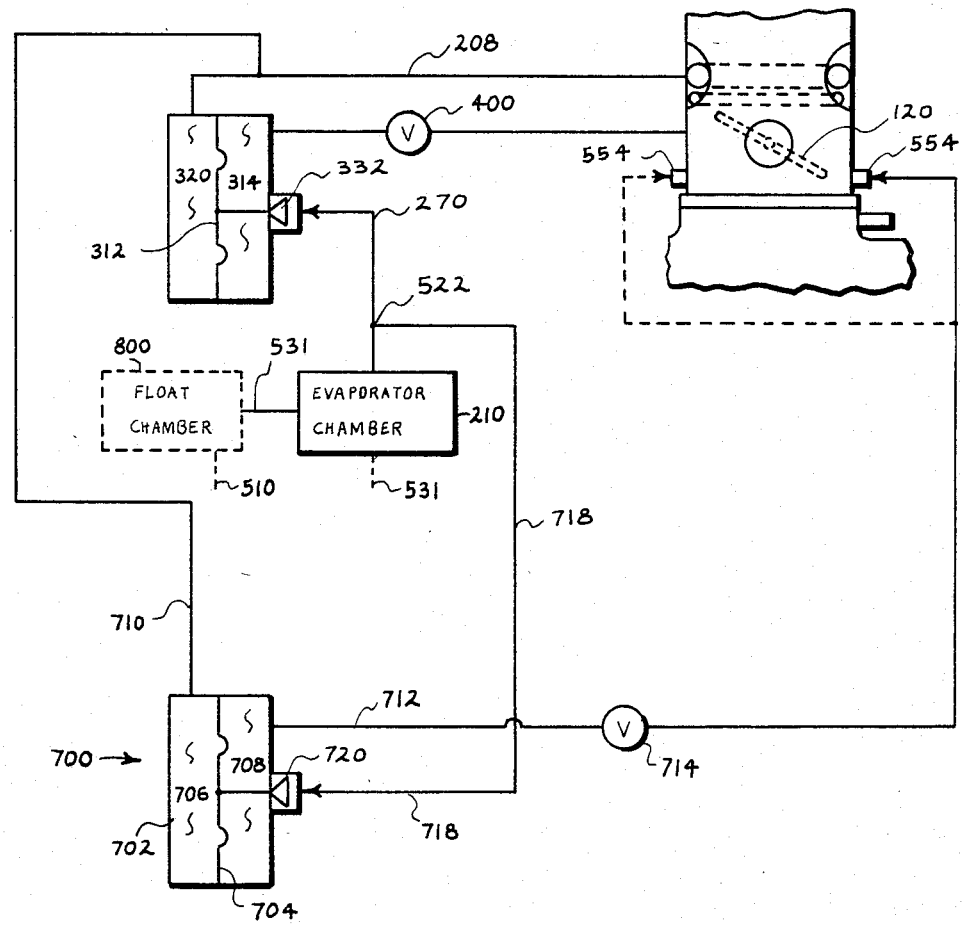
Fig. 18.

MOLECULAR DIFFUSER ASSEMBLY

This is a continuation of application Ser. No. 134,107, filed Mar. 26, 1980, now abandoned.

BACKGROUND OF THE INVENTION

This invention pertains to an assembly for the diffusion of a fuel vapor with an oxidizing agent so as to produce a combustible mixture and, more particularly, to such a device functioning as a carburetor for introducing a fuel/air vapor mixture into an induction system of an internal combustion engine.

The burgeoning interest in fuel economy of known internal combustion engines has led to critical reevaluations of the internal combustion engine, and more particularly, to the associated fuel systems and/or components used to present a combustible mixture thereto. Normally, such fuel systems have included a carburetor which sprays liquid fuel into an air stream so as to break down the fuel into a plurality of droplets striving to approach a vaporized state so as to be susceptible for subsequent combustion.

Prior evaluations of known carburetors have spawned a plurality of devices and/or improvements associated therewith which were designed to enhance the dispersion of the fuel droplets into increasingly finer particles, this process commonly referred to as atomization of the fuel. These devices have provided for atomization at various stages prior to fuel entry into the associated internal combustion system.

However, such evaluations of atomization of the liquid fuel have failed to appreciate that only those molecules at the exterior surface of the fuel droplet are in a position to obtain sufficient energy to escape the fuel droplet so as to be able to diffuse with the surrounding air.

If the surrounding air does not contain sufficient heat to evaporate all of the liquid droplet, a mixture of gaseous air, gaseous fuel and fuel droplets results. Such a mixture can be considered a saturated vapor mixture which needs further heat energy for complete evaporation. However, attempts to add the required external heat without regards to a mixture temperature limit have caused the fuel mixture to rise to a temperature at which preignition and subsequent detonation can occur as well as a reduction in the density of the composite fuel/air mixture ratio leading to a reduction in h.p. But if the air/fuel mixture is cooled during this evaporation process, the existence of a critical temperature must be considered below which it is not possible to evaporate all the fuel droplets suspended in the air.

After such a mixture is introduced into the internal combustion system, combustion will occur with part of the energy released during the combustion process absorbed into the evaporation of the remaining aerosol droplets of the fuel. However, insufficient oxygen is available to completely burn the incoming mixture which causes the remaining fuel droplets to exit the combustion chamber as unburned hydrocarbons in the exhaust system, which may lead to undesirable combustion therein with resulting emissions.

Although it is possible to sufficiently evaporate liquid engine fuels into the surrounding air given a sufficiently extended time for such process to occur, it is apparent that such time is not available in the internal combustion engine as there is very little time between presentation of the fuel and combustion. To overcome such a short time span much more fuel is presented for combination with the incoming air than is actually needed to form an optimal combustible mixture. Accordingly, it can be seen that most of the fuel is now wasted in the operation of the internal combustion engine.

It has been recently recognized that the liquid fuel must be put into a complete vaporized state in order to present the greatest degree of separation of molecules in each fuel droplet so as to increase the rate of reaction with the oxidizing airstream. However, problems have arisen in known structures attempting to implement this concept, including the above-mentioned overheating problems and more importantly the failure to properly deliver the fuel/air mixture to the internal combustion system in accordance with known parameters associated therewith. Accordingly, the manner of vaporization of the fuel, the diffusion of the vaporized fuel with the oxidizing agent and, more particularly, the introduction of such a mixture to the internal combustion engine must be addressed.

This invention provides a carburetor-type device for association with an internal combustion engine which efficiently heats the liquid fuel at a safe temperature to present a vapor state; superheats the vapor at a safe operating temperature to present a relatively dry gas; provides means for regulating the flow rate of this dry vapor, relative to the rate of flow of the incoming airstream being drawn into the internal combustion engine, for diffusion therewith; and provides means for controlling the fuel/air ratio mixture delivered into the internal combustion system.

SUMMARY OF THE INVENTION

The preferred embodiment of the molecular diffuser as shown herein is designed to replace the carburetor of an internal combustion engine and as such is connected to the associated intake manifold. The molecular diffuser generally comprises a cylndrical main body section presenting a passageway for an airstream drawn therethrough and has a venturi mounted therein. A throttle assembly in the passageway regulates the flow rate of the airstream so as to ultimately regulate the engine speed during engine operation. An idle system is also provided, used primarily for engine startup.

A fuel evaporator assembly within the molecular diffuser is used for raising the temperature of the liquid fuel injected therein. A boiler/heater is used for such temperature elevation and includes a stack of thermistor-type heat elements for raising the temperature of the liquid fuel to the highest boiling point temperature of a constituent found in the liquid fuel so as to assure a total vapor state. The heating elements also superheat vapors of constituents having lower boiling points to assure a substantially dry and complete fuel vapor state.

A conduit provides a passageway for the vaporized fuel from the evaporator assembly to the venturi throat. Regulator means are associated with this conduit and have therein a diaphragm responsive to changes of pressure acting thereon so as to operate a valve member interposed in the conduit which controls the rate of vapor flow from the evaporator assembly to the venturi throat.

A fuel demand by the associated internal combustion engine causes air to be drawn through the venturi for mixture with vapor injected therein so as to present a fuel/air mixture for ignition in the engine combustion chamber.

Parametric measurements of the static pressure of the air flowing through the passageway is taken at the inlet thereof and at the venturi throat and relayed to the diaphragm so as to provide a differential pressure indicative of the flow rate of the mass through the passageway. The pressure-sensitive diaphragm is accordingly responsive to the receipt of such information, indicative of the mass flow rate, and operates in a manner to vary the degree of valve member interposition in the vapor flow conduit. This response allows for a sufficient flow rate of the vaporized fuel into the conduit for delivery to the venturi throat so as to diffuse with the airstream passing therethrough. A mixture control valve, interposed in the vapor flow conduit, after the regulator means, further adjusts the amount of the vaporized fuel introduced into the venturi so as to provide for a selected fuel/air ratio which may be operator or automatically varied according to altitude and fuel enrichment requirements.

A condensate return system is used to drain condensate formed within the molecular assembly for return of the condensate to the fuel supply. A fuel delivery system is also provided for delivery of the liquid fuel to the molecular diffuser and incorporates therein means for inhibiting pressure buildup within the molecular diffuser as well as means for delivering liquid fuel to the idle system during engine startup. An automatic purge system is also provided so as to discharge the vaporized fuel from the molecular diffuser upon engine shutdown.

It is therefore a general object of this invention to provide a process and performing apparatus for combining a gas and a liquid fuel into a dry gaseous mixture of desired proportions by means of evaporation of the liquid and diffusion of the same with the gas.

Another general object of this invention is to provide a process and performing apparatus, as aforesaid, in which the temperature of the liquid fuel is elevated to the temperature of the highest boiling point of a constituent found therein so as to provide a substantially complete evaporation of the liquid.

Another object of this invention is to provide apparatus, as aforesaid, particularly designed for use with internal combustion engines.

Another important object of the invention is to provide apparatus, as aforesaid, which reduces fuel consumption due to efficient mixture of the fuel and air and reduces the appearance of unburned hydrocarbons in the associated integral combustion engine.

A further object of this invention is to provide apparatus, as aforesaid, presenting a boiler/heater assembly therein which brings each of the constituents of a liquid fuel to its respective boiling point as well as superheats the respective constituent vapors resulting from said boiling point elevation.

Still another object of this invention is to provide apparatus having a boiler/heater assembly therein, as aforesaid, which has a plurality of heat elements operating therein with each element designed to operate at a maximum and relatively safe operating temperature corresponding to the highest boiling point temperature of the constituent found in the liquid fuel.

A still further object of this invention is to provide a boiler/heater assembly having a plurality of heat elements therein, as aforesaid, in which selected elements are used to initially boil the fuel and other heat elements are used to superheat the resulting vapor gases resulting from said boiling.

Another object of this invention is to provide apparatus, as aforesaid, which has a regulator assembly therein for controlling the rate of vaporized fuel flow in response to a demand for combustible fuel by the associated internal combustion engine.

Still another object of this invention is to provide apparatus having a regulator assembly, as aforesaid, with a valve operator member therein which is responsive to the changes of the flow rate of the mixture flowing to the associated internal combustion engine.

A further object of this invention is to provide a regulator assembly, as aforesaid, which has means therein to stabilize the valve operator member at a selected position to allow for a sufficient rate of flow of vapor fuel to the associated airstream.

A still further object of this invention is to provide apparatus, as aforesaid, having means therein for deriving information indicative of a mass flow rate and delivering such information to the regulator assembly.

A more particular object of this invention is to provide apparatus, as aforesaid, having a venturi passageway therein for flow of the mixture therethrough and producing differential pressures in said mixture flow so as to provide for parameters indicative of the rate of mixture flow.

Still another object of this invention is to provide apparatus, as aforesaid, having a fuel/air mixture control device therein allowing for adjustment of the fuel-/air mixture ratio by the operator.

Still a more particular object of the invention is to provide a device, as aforesaid, which is automatically responsive to fuel enrichment requirements by the engine as well as changes in the air density of the engine milieu.

Another particular object of this invention is to stabilize the temperature of the fuel/air mixture and induction system therewith to aid in prevention of condensation within the internal combustion engine.

Still another particular object of this invention is to provide apparatus, as aforesaid, having a condensate return system therein designed to drain liquid condensate from the apparatus.

A more particular object of this invention, as aforesaid, is to provide means for delivering liquid fuel to the boiler/heater assembly at a rate proportional to the mass flow rate of the vaporized fuel flow as demanded by the associated internal combustion engine.

Other objects and advantages of this invention will become apparent from the following description taken in connection with the accompanying drawings, wherein are set forth by way of illustration and example a preferred embodiment of this invention.

BRIEF DESCRIPTION OF THE DRAWINGS

FIG. 10 is a sectional view taken along line 10—10 in FIG. 6;

FIG. 16 is a sectional elevation view similar to the view shown in FIG. 8 showing the addition of a fuel float chamber in communication with the fuel evaporator assembly;

FIG. 17 is a sectional elevation view taken along line 17—17 in FIG. 16;

FIG. 18 is a diagrammatic view showing a means for regulating the flow of vapor fuel into the fuel idle system.

DESCRIPTION OF THE PREFERRED EMBODIMENT MAIN BODY ASSEMBLY

Figure 1:
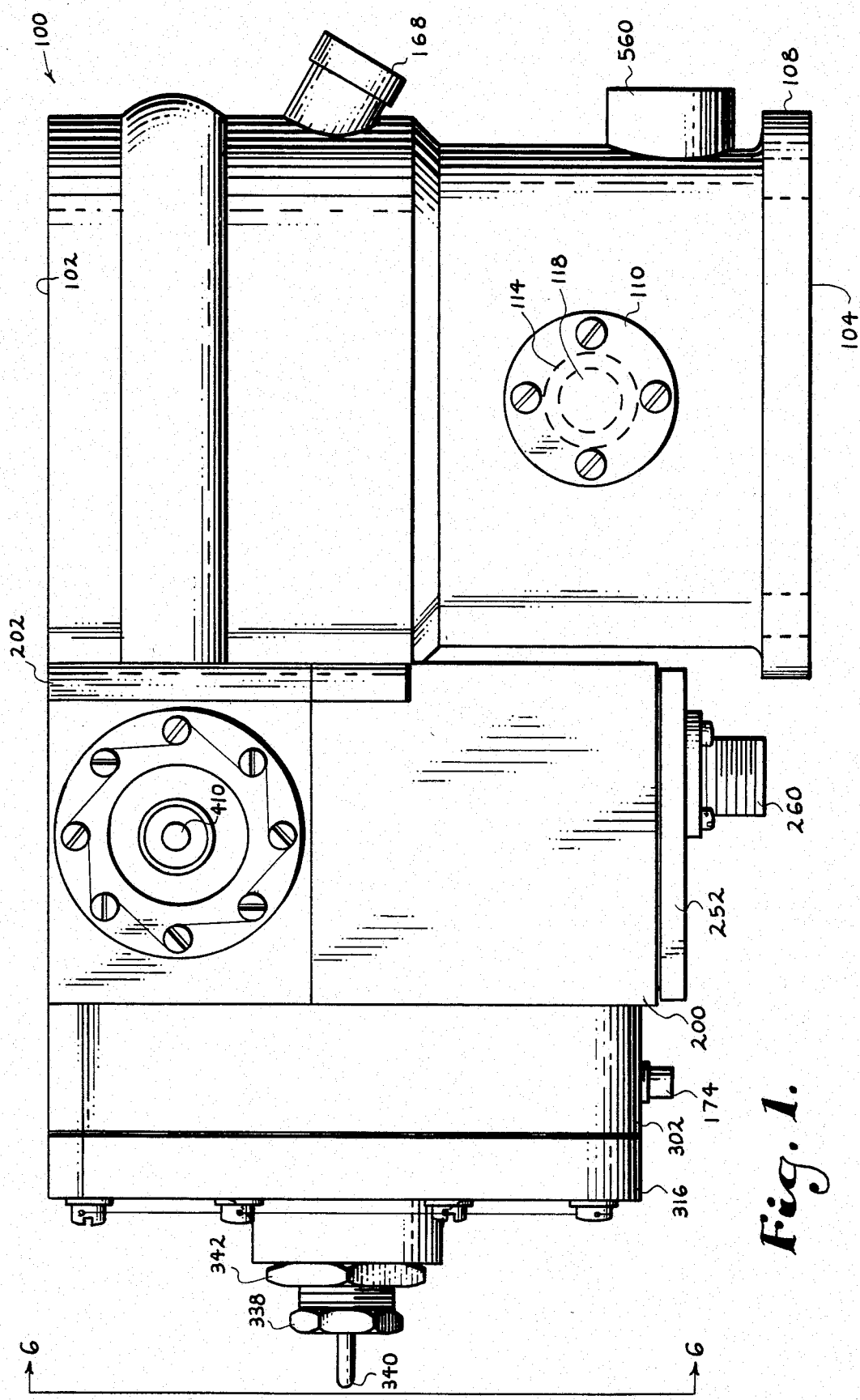
FIG. 1 is a side elevation view showing one side of the molecular diffuser.
Figure 2:
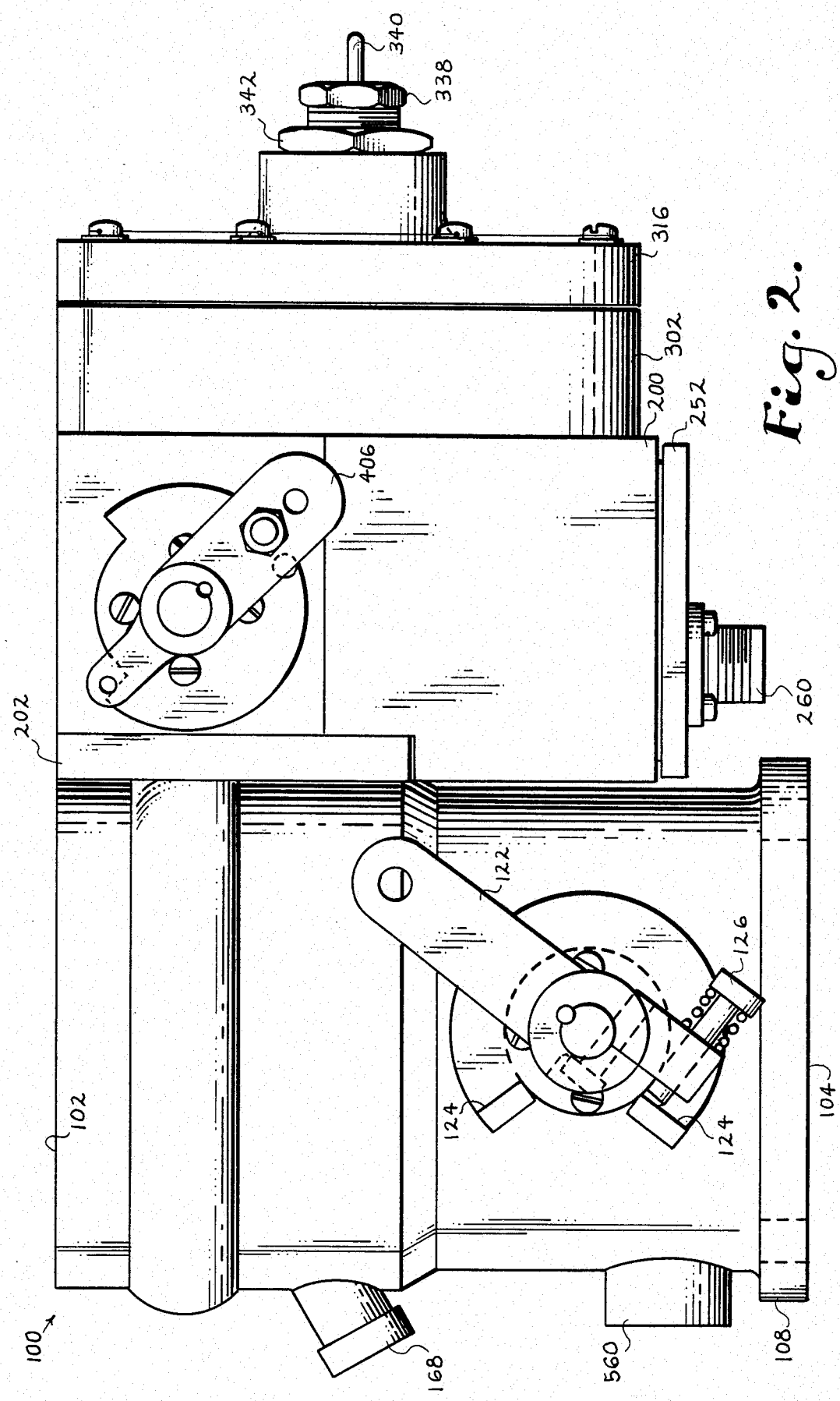
FIG. 2 is a side elevation view showing the opposed side of the molecular diffuser relative to that side shown in FIG. 1.

A main body assembly 100, generally cylindrical in configuration, has openings at the upper and lower ends to present an air receiving inlet 102 and an air discharge outlet 104 with a passageway 106 therebetween. A mounting flange 108 about the outlet end 104 facilitates the attachment of the main body 100 to the intake manifold of the associated internal combustion engine. Upon attachment by bolts (not shown) or the like, the passageway 106 provides a means of communication of ambient air to the internal combustion engine as drawn into the inlet end 102, through the passageway 106 and discharged from the outlet end 104 thereof.

Figure 3:
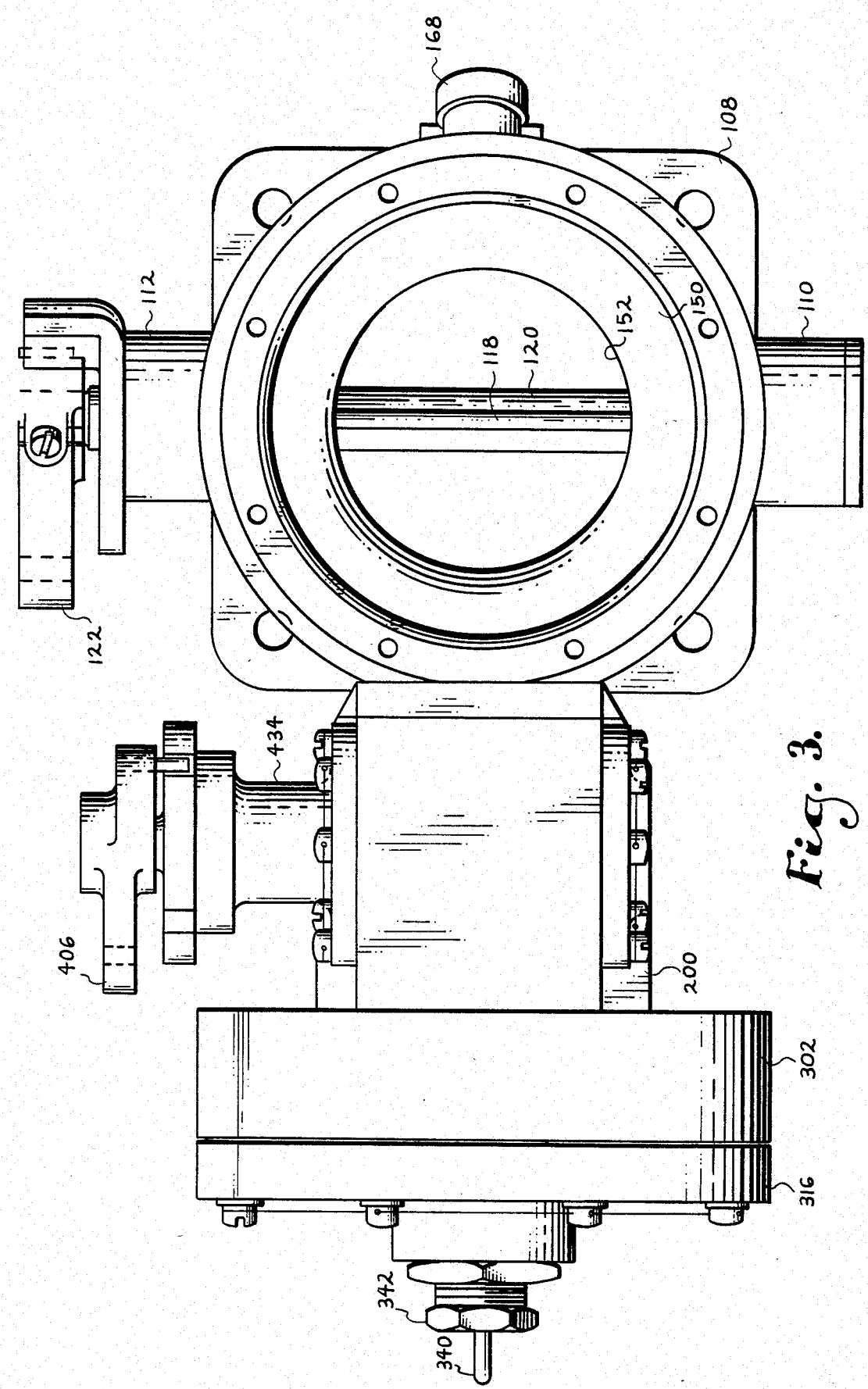
FIG. 3 is a top view of the molecular diffuser.
Figure 4:
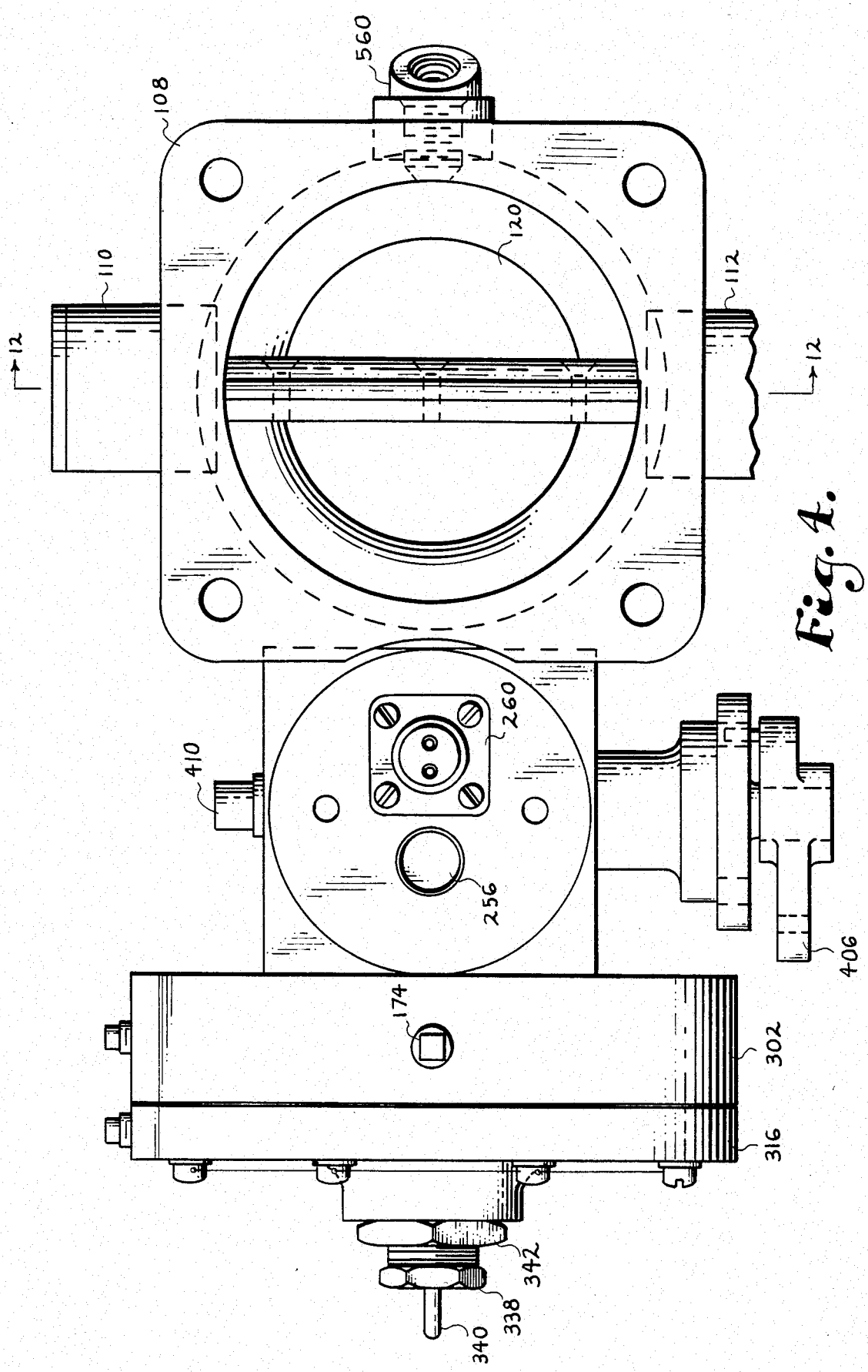
FIG. 4 is a bottom view of the molecular diffuser.
Figure 5:
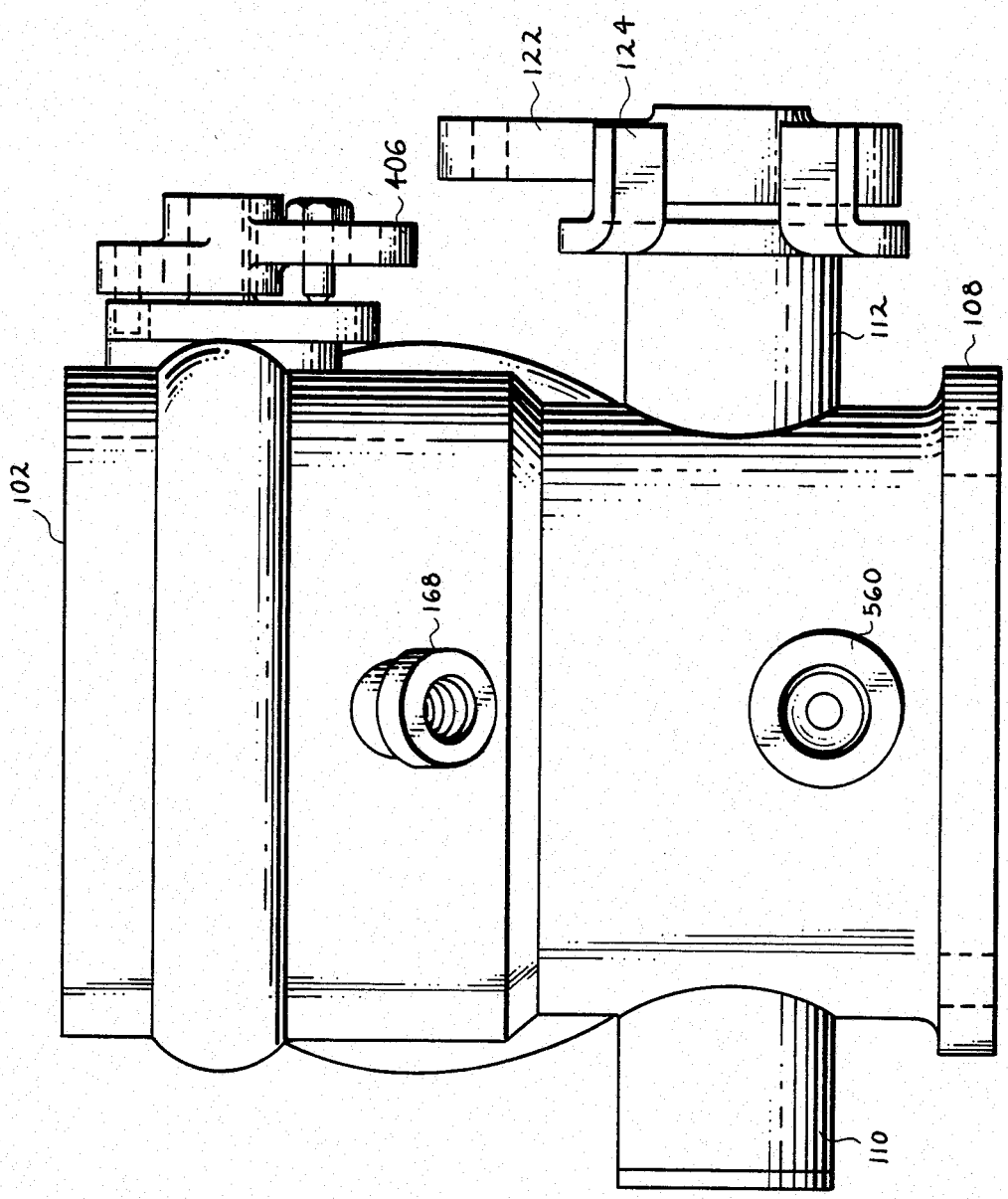
FIG. 5 is a front view of the molecular diffuser.
Figure 6:
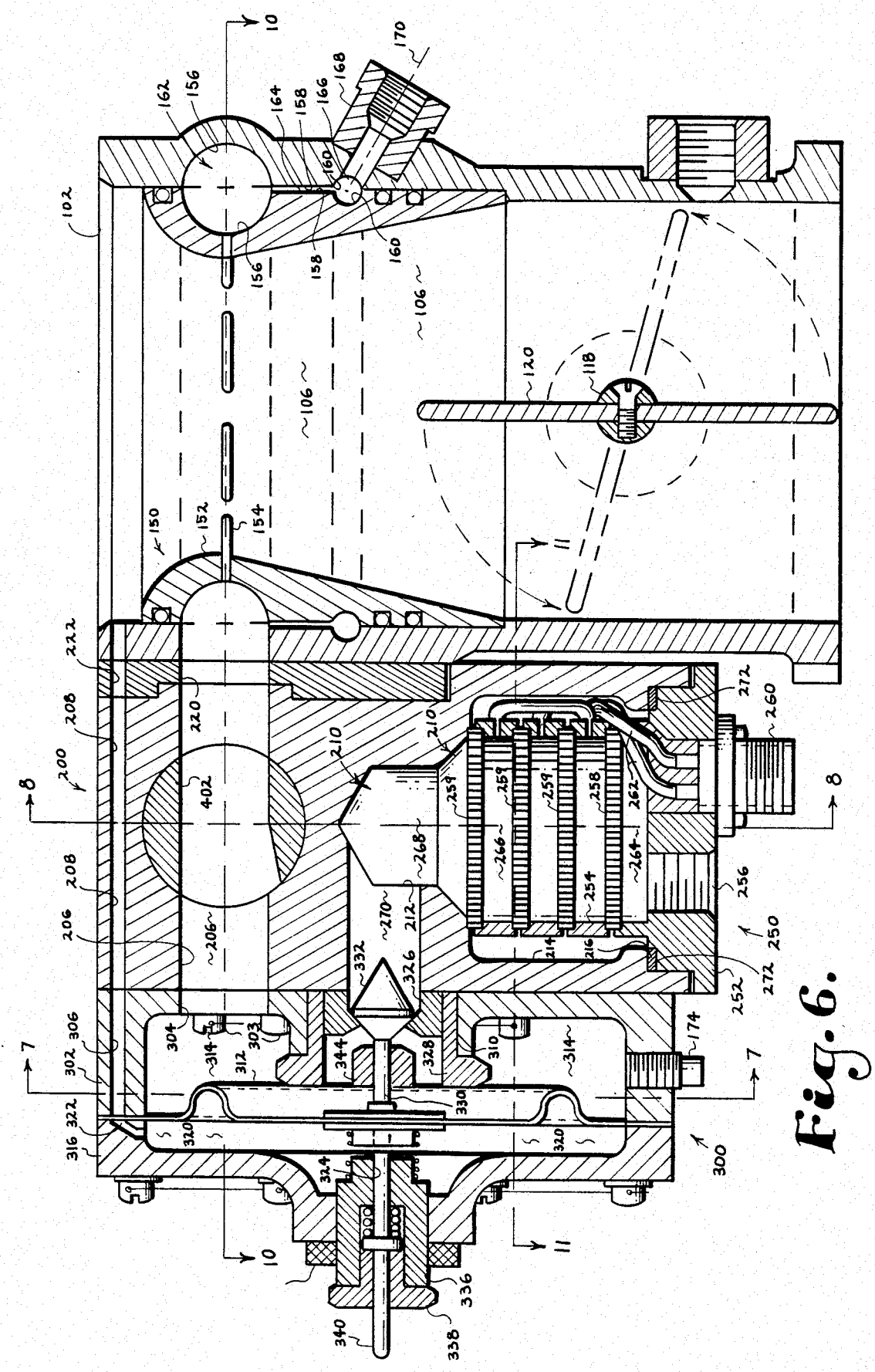
FIG. 6 is a sectional elevation view taken along line 6—6 in FIG. 1.
Figure 7:
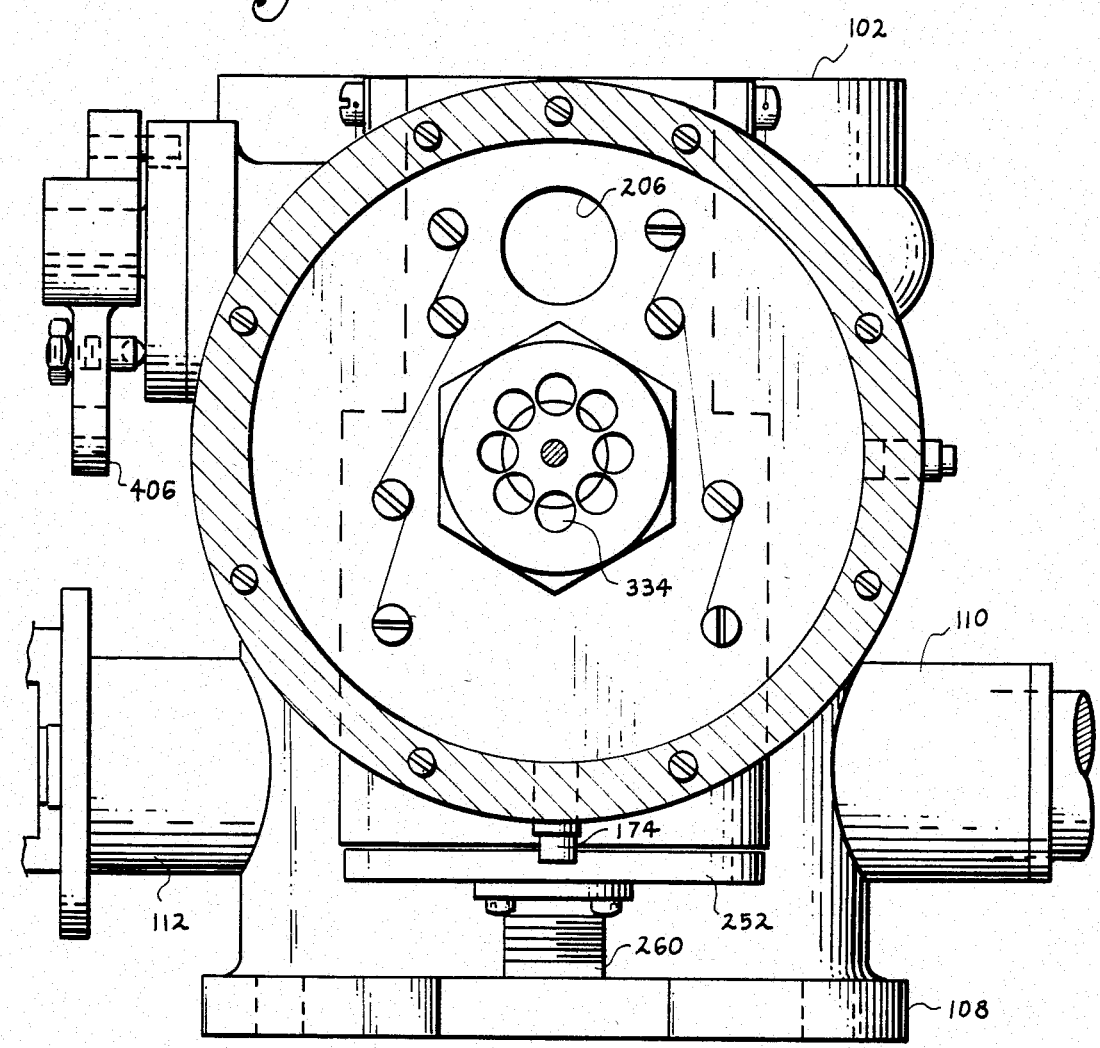
FIG. 7 is a sectional elevation view taken along line 7—7 in FIG. 6.
Figure 8:
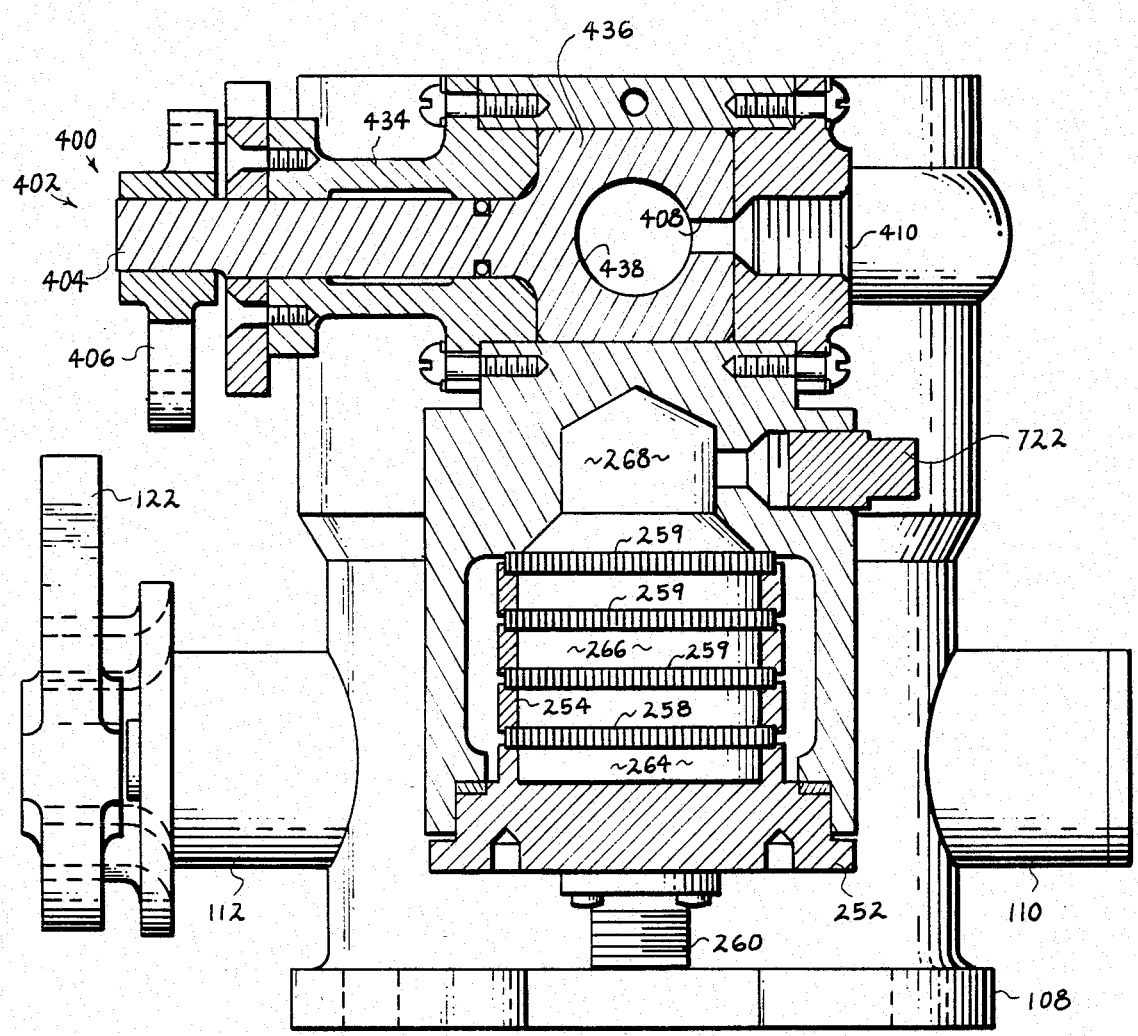
FIG. 8 is a sectional elevation view taken along line 8—8 in FIG. 6 showing the mixture control valve at the top thereof.

Adjacent the outlet end 104 are first and second bearing housings 110 and 112 extending from opposed sides of the main body 100 as shown in FIGS. 3 and 5. Bearings 114 and 116 are positioned within the respective housings 110 and 112 so as to receive the ends of a throttle shaft 118 therein. Shaft 118 is rotatable about its longitudinal axis to vary the attitude of a throttle plate 120 connected thereto within the passage 106. Rotation of the shaft 118 to present a vertical disposition of the throttle plate 120 within the passageway 106 as shown in FIG. 6, presents a minimum blockage to the flow of an airstream drawn through passageway 106. This position is normally designated as full throttle. A transverse positioning of the throttle plate 120, or nearly so as shown in phantom lines in FIG. 6, presents a maximum blockage of the flow of an airstream drawn through passageway 106 and is normally so positioned when the associated internal combustion engine is in an idle state. The throttle plate 120 is variously adjustable between these two positions and functions as a valve controlling the rate of mass flow through the associated passageway 106, and thus, ultimately the amount of fuel mixture to the associated internal combustion engine.

A throttle arm 122 is attached to a projecting end of shaft 118 and is further linked by conventional means (not shown) so as to provide operator control to the rotation of shaft 118 and connected throttle plate 120. A throttle limit plate 124 acts in conjunction with a throttle stop 126 so as to restrain the rotation of the throttle plate 120 between the above-discussed positions of minimum and maximum blockage of passageway 106. O-rings 128 about the end of the throttle shaft 118 within housing 112 prevents leakage of external ambient air into the passageway 106 as well as leakage of the fuel mixture therefrom.

In operation the throttle plate 120 functions in a manner similar to the butterfly valve of the carburetor associated with the internal combustion engine. Ordinarily at high speeds a full throttle position is presented allowing for a maximum rate of mass flow through passageway 106 while at low speeds and engine idle a minimum mass flow rate of fuel/air mixture into the internal combustion engine is demanded allowing for a setting of the throttle plate 120 to a position transversing passageway 106. Accordingly, the position of the throttle plate 120 controls the mass flow rate of the fuel/air mixture into the internal combustion engine and thus ultimately controls the speed at which the internal combustion engine runs.

VENTURI

The venturi structure 150 is a generally cylindrical piece designed to be mounted within the passageway 106 adjacent the inlet end 102 thereof. The venturi 150 presents a constricted portion or throat 152 adjacent the inlet end 102 which is used to accelerate the flow rate of the mass of air drawn through the passageway 106 through the inlet end 102. A plurality of slots 154 are located about the annular venturi throat 152 providing communication between the passageway 106 at the venturi throat 152 to the exterior thereof.

About the exterior surface of the venturi 150 are machined: a semicircular annular channel 156; one-half of a longitudinal annular slot 158 and a semicircular annular channel 160, smaller in radius than that of the semicircular annular channel 156.

Upon positioning of the venturi 150 within the main body assembly 100, as shown in FIG. 6, these particular channels 156, 160 and slot 158 register with corresponding channels 156' and 160' in the main body 100 and slot 158' to form a venturi annular channel 162, a condensate drain slot 164 and a condensate return channel 166, the purposes of which are to be subsequently discussed. The plurality of slots 154 located about the venturi throat 152 provides a means of communication between the venturi throat 152 and venturi annular channel 162 encompassing the exterior of the venturi 150 at the throat 152 thereof.

EVAPORATOR BODY

The evaporator/mixture body 200 is joined to the main body assembly 100 through interface plate 202 and has therein a fuel evaporator chamber 210 and a vapor flow channel 206. The vapor flow channel 206 is generally circular in configuration and is horizontally disposed through the longitudinal extent of the uppoer portion of the evaporator body 200. In communication on opposed sides of the vapor channel 206, at the medial portion thereof, is a mixture control assembly 400 and flow bypass assembly 407 to be subsequently described.

A second circular channel designated as an inlet pressure conduit 208 is positioned above the vapor flow channel 206 and extends along the longitudinal extent of the evaporator body 200. It is understood that similar passageways 220 and 222 exist in the interface plate 202. These interface plate channels register with a portion of the venturi annular channel 162 and vapor flow channel 206. Similarly the interface plate has a channel 222 extending therethrough registering with the inlet pressure conduit 208. Disposed below the vapor flow channel 206 is a fuel evaporator chamber 210 designed to receive the evaporator assembly 250 therein. The fuel evaporator chamber 210 is divided into an upper dome-shaped compartment 212 and a heater element compartment 214. A threaded flange 216 at the lower end of chamber 210 provides engagement with threads on the base plate 252 of the fuel evaporator assembly 250.

THE FUEL EVAPORATOR/SUPER HEATER ASSEMBLY

The fuel evaporator assembly 250 comprises a mounting plate 252 with threads 272 on the surface thereof and functions as a plug sealing the bottom of the fuel evaporator chamber 210. Extending from the upper surface of the closure plug 252 is an annular supporting structure 254 for supporting the plurality of heating elements 258, 259 in a spaced apart relationship therein.

The heating elements 258, 259 are thin discs made of a barium titanate material with a honeycomb configuration thereto and function as thermistors having a maximum preselected operating temperature of 395° F. when current is connected thereto. Each element 258, 259 has the property of drawing a selected amount of electrical current thereto to arrive and maintain itself at this selected operating temperature. Upon reaching 395° F., little or no current is subsequently drawn. If cooled below that temperature, the elements 258, 259 draw the required current so as to return to their preselected operating temperature (395° F.). Such elements 258, 259 are known in their art and are used herein because of certain advantages including their compact configuration, the optimal transfer of heat to contacting substances and especially the design compatibility with this preferred embodiment. Furthermore, being composed of a noncombustible and generally inert material with respect to the incoming fuel to be heated there is a negligible chance of chemical reaction therewith.

Located in the base plate 252 is a fitting 256 providing an inlet port for the liquid fuel. A plug 260 is also located within base plate 252 to provide for connection to an electrical power source (not shown). Wires 262 extend from the plug 260 and are connected to the annular support structure 254 in a manner to deliver the current from a power source as demanded by each individual element 258, 259.

Upon mating engagement of threads 272 with the threads 216 at the bottom of chamber 210, the evaporator assembly 250 is fully contained within the evaporator chamber 210. As can be seen from FIG. 9, a number of chambers are then presented including a boiler chamber 264 formed by the top surface of the closure plug 252 and the bottom heating element 258. This is the region in which the raw liquid fuel as urged through fitting 256 is presented to the evaporator 250 and is heat converted to an initial but relatively moist fuel vapor.

The center chamber 266 contains the stack of three heating elements 259 functioning as superheating elements. It is in this region that the moist fuel vapors are heated to approximately 395° F. Any condensed fuel vapors returning from subsequent parts of the system will be subject to reheating in chamber 266 and thus maintain its evaporated and superheated state.

The temperature 395° F. has been selected as it has been found that the currently available low and no lead fuels have a number of constituents therein which commence to boil at approximately 100° F. with a highest boiling point temperature of 395° F. The assembly 250 as described assures a vaporization of all constituents in the fuel as well as provides a means of superheating the previously vaporized constituents so as to remove any extra moisture therein.

Above the superheating elements 259 is a dome chamber 268 in which the superheated fuel collects to await throttling to the vapor flow channel 206 by the regulator assembly 300 as to be subsequently described. A horizontally disposed vapor dome channel 270 extends from the dome chamber 268 to the rear of the evaporator body 200 with a throttling valve 332 located at the terminal end thereof.

PRESSURE REGULATOR

The fuel pressure regulator assembly 300 includes a generally cylindrical body section 302 mounted to the rear of the evaporator body 200 by screws 303 or the like. Upon mounting, a vapor flow channel opening 304 and a static pressure conduit 306 located at the front end of body section 302 are aligned with the corresponding vapor flow channel 206 and inlet pressure conduit 208 in the evaporator body 200. A threaded opening 310 at the center of body section 302 lies coaxial with the longitudinal axis of the circular vapor dome channel 270. A diaphragm 312 of a generally circular configuration extends across the body section 302 at the rear end thereof to seal the same and forms a dynamic pressure chamber 314 therein.

An endcap section 316, generally cylindrical in configuration mates with the cylindrical body section 302, with diaphragm 312 therebetween by screws or the like so as to present a static pressure chamber 320 on the opposed side of the diaphragm 312. Conduit 322 in endcap section 316 is aligned with the opening of conduit 306 to provide a communication of said inlet pressure conduit 208 into said static pressure chamber 320.

Functionally engaging the threaded opening 310 is a valve seat 326 assembly. A circular valve port plug 328 is threadably engaged with this opening 310 and abuts an end of the valve seat assembly 326 as shown in FIG. 6. The plug 328 provides a shaft seat 344 for the shaft 330 of the throttling valve 332. The plug 328 has a series of apertures 334 about the center thereof presenting ports for flow of vaporized fuel therethrough. Shaft 330 is connected to the diaphragm 312 and is concurrently responsive to diaphragm movement so as to variously unseat valve 332 to produce a variable degree of interposition in the vapor dome channel 270 and thus control the rate of vaporized fuel flow therefrom.

Inserted into endcap 316 is a valve reseat bore 324 located at the rear of the endcap section 316 with a gauge sleeve 336 and a gauge plug therein 338. Extending through the plug 338 and sleeve 336 is a spring-biased gauge stem 340 with one end adjacent the end of the valve shaft 330 and the other end projecting from the rear of the plug 338. The stem 340 is manually operated to unseat the valve 332 from its valve seat position. A gauge jam nut 342 surrounds the 336 gauge sleeve and maintains the valve reseat assembly therein.

MAIN MIXTURE CONTROL VALVE ASSEMBLY

The main mixture control valve assembly 400, as best seen in FIG. 10, includes a valve housing 434 containing therein a rotary valve 402 having a face 436 with an opening 438 extending therethrough. The valve face 436 is positioned within the vapor flow channel 206 with the longitudinal axis of the channel 206 extending normally through the opening 438 upon placing the valve at a fully open position. Extending from the valve face 436 is shaft 404 with a mixture control valve arm 406 at the end thereof. The arm 406 is further equipped with conventional linkage means (not shown) extending therefrom allowing for valve control by an operator displaced therefrom.

The valve 402 functions as a 90° shutoff valve allowing for a free vapor flow when opening 438 is aligned with the circular channel 206. A blockage of flow of the vapor through the channel 206 is achieved upon rotating the valve face 436, 90° from this free flow position.

A transverse orifice 408 in said face 436 and communicating with the inner perimeter of opening 438 registers with a flow bypass port 410 when the valve 402 is in its blocking position. At such a position any fuel vapor within channel 206 is routed to the idle mixture system via this bypass port.

This operator-controlled valve 402 is used to vary the ratio of the fuel/air mixture according to the degree of fuel enrichment required by the associated internal combustion engine. Also, the valve 402 can stop all flow of fuel vapor through the channel 206 to cause engine shutdown in cases of emergency or to prevent the accumulation of fuel gas vapors in the induction system of the internal combustion engine when not in use.

Figure 9:
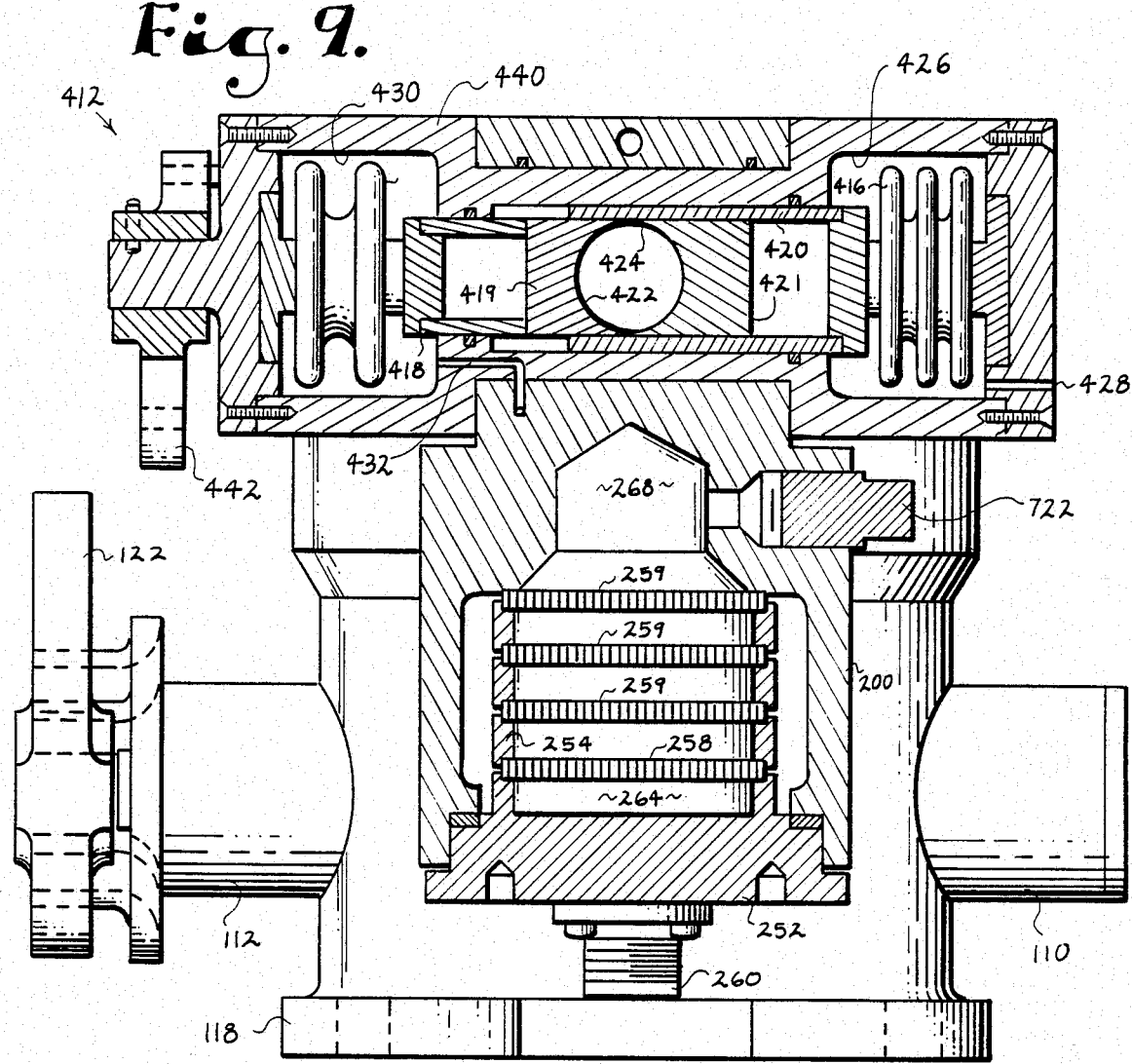
FIG. 9 is a sectional elevation view similar to that shown in FIG. 8 with an alternative embodiment of the mixture control valve positioned at the top thereof.
Figure 13:
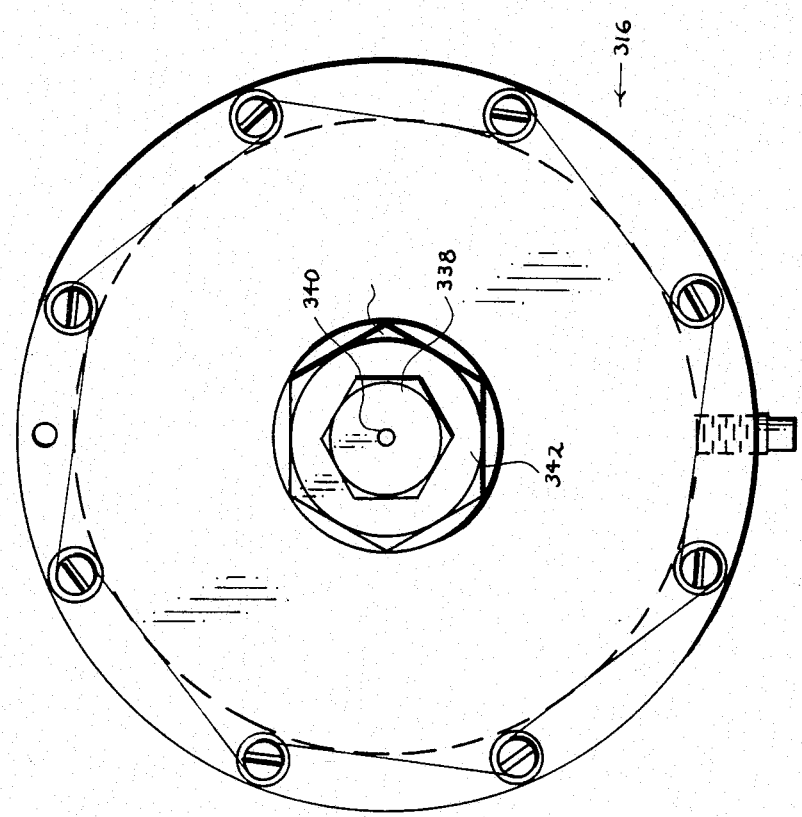
FIG. 13 is an end view of the molecular assembly showing the end cap thereof.
Figure 11:
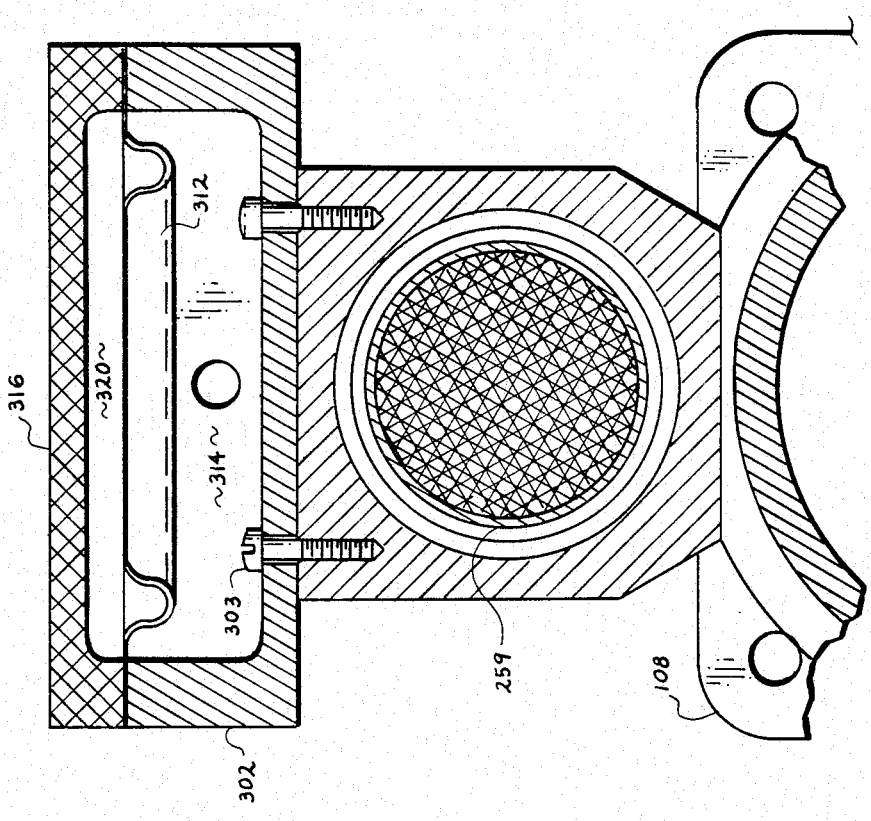
FIG. 11 is a sectional view taken along line 11—11 in FIG. 6 showing one of the thermistor-heating elements.
Figure 12:
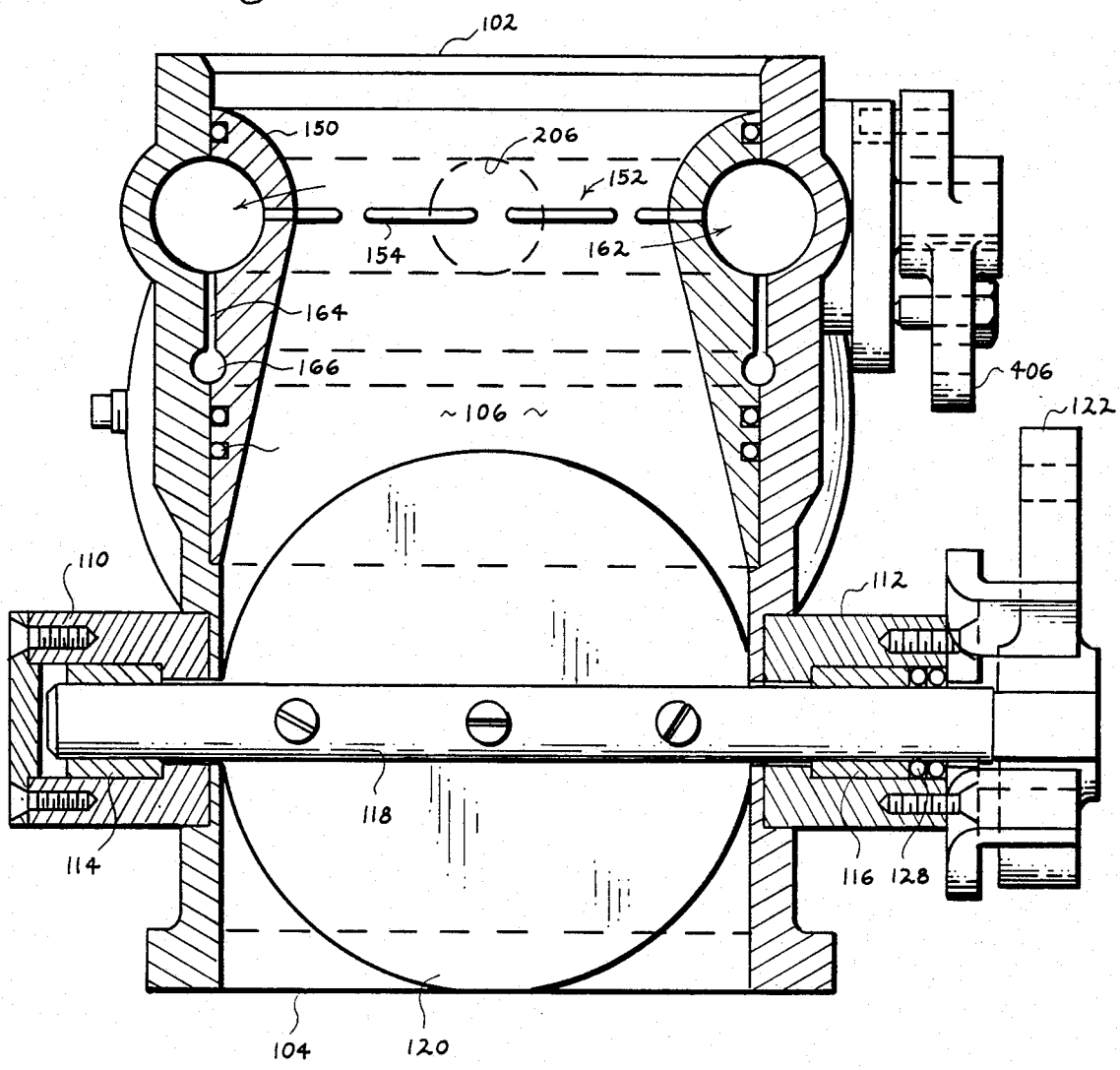
FIG. 12 is a sectional elevation view taken along line 12—12 in FIG. 4 showing the main body member housing the venturi and throttle assembly therein.

An alternative embodiment 412 of the main mixture control valve assembly 400 is as shown in FIG. 9, which is generally vacuum operated. This mixture control assembly 412 within a housing 440 comprises a pair of pressure sensitive aneroid cells 414 and 416 for controlling a pair of attached sliding sleeves 418 and 420. Each sleeve 418 and 420 has a plate 419 and 421 attached at the ends thereof with each plate 419 and 421 having circular bores 422 and 424 respectively therein. The first sleeve 418 is in sliding engagement with sleeve 420 with the plates 419 and 421 and bores 422 and 424 aligned one behind the other. The respective plates 419 and 421 extend across the circular vapor dome channel 206, as shown in FIG. 9.

Aneroid cell 416 is positioned within chamber 426 in said housing 400, which is communicated by a port 428 to the ambient air, and is thus responsive to changes in air density. Upon such a response by the aneroid cell 416, sliding sleeve 420 moves accordingly so as to vary the degree of alignment of the second circular bore 424 with the first circular bore 422 and thus the rate of vaporized fuel of flow through the vapor flow channel 206.

A second aneroid-type cell 414 located in chamber 430 in said housing is responsive to fuel enrichment requirements by the internal combustion engine. As such a manifold pressure conduit 432 extends from chamber 430 and is in communication with the intake manifold of the internal combustion engine, the changes in manifold pressure being indicative of changes in the fuel enrichment demand. Accordingly, sleeve 418 slides within sleeve 420 to vary the degree of circular bore 422 and 424 alignment in the manner as above mentioned.

Sleeve 418 may also be manually controlled by the operator by means of an arm 442 providing direct movement to cell 414 and sleeve 418 connected thereto. Conventional linkage means (not shown) allow for manual control of the arm 442 by the operator at a distance displaced therefrom. The arm 442 can be used to adjust the degree of bore 422, 424 alignment according to exhaust manifold temperature as operator monitored by conventional temperature gauges.

As shown, the bores 422 and 424 are in perfect alignment which represents a setting at sea level and a full power enrichment requirement.

CONDENSATE RETURN SYSTEM

Provisions are incorporated into the molecular diffuser to remove condensed fuel from the diffuser and return it to the fuel system. As previously shown, the bottom of the dynamic pressure chamber 314 has a plug 174 therein so as to drain condensate forming in the dynamic pressure chamber 314 through plug 174 and to the fuel tank via line 172. Also, about the venturi 152 is located the condensate drain slot 164 communicating the venturi channel 162 with the condensate return channel 166. Condensate forming on the walls of the venturi channel 162, drains through this annular slot 164 into the condensate return channel 166. Channel 166 functions as a trough directing the collected condensate to the condensate drain tap 168 located on the front of the diffuser for return to the fuel tank through line 170.

The use of separate condensate drain lines 170 and 172 determinately positioned relative to the fuel tank 502 provides for a pressure differential fluid trap therein which prevents fuel vapors or air from communicating to the venturi throat 152 from the dynamic pressure chamber 314 through the respective lines 170 and 172. Also, these two condensate return points 168 and 174 constitute the lowest points in the diffuser so that all condensate formed in the diffuser will flow to these points.

During engine startup and warming a large amount of condensate will return from both points 168, 174. However, after the molecular diffuser reaches its normal operating temperature, very little condensate will be formed in the dynamic pressure chamber 314 with the majority of the condensate forming in the venturi channel 162 due to heat losses at the venturi throat 152 resulting from the air mass flowing therethrough to the engine induction system.

FUEL SUPPLY SYSTEMS

Figure 14:
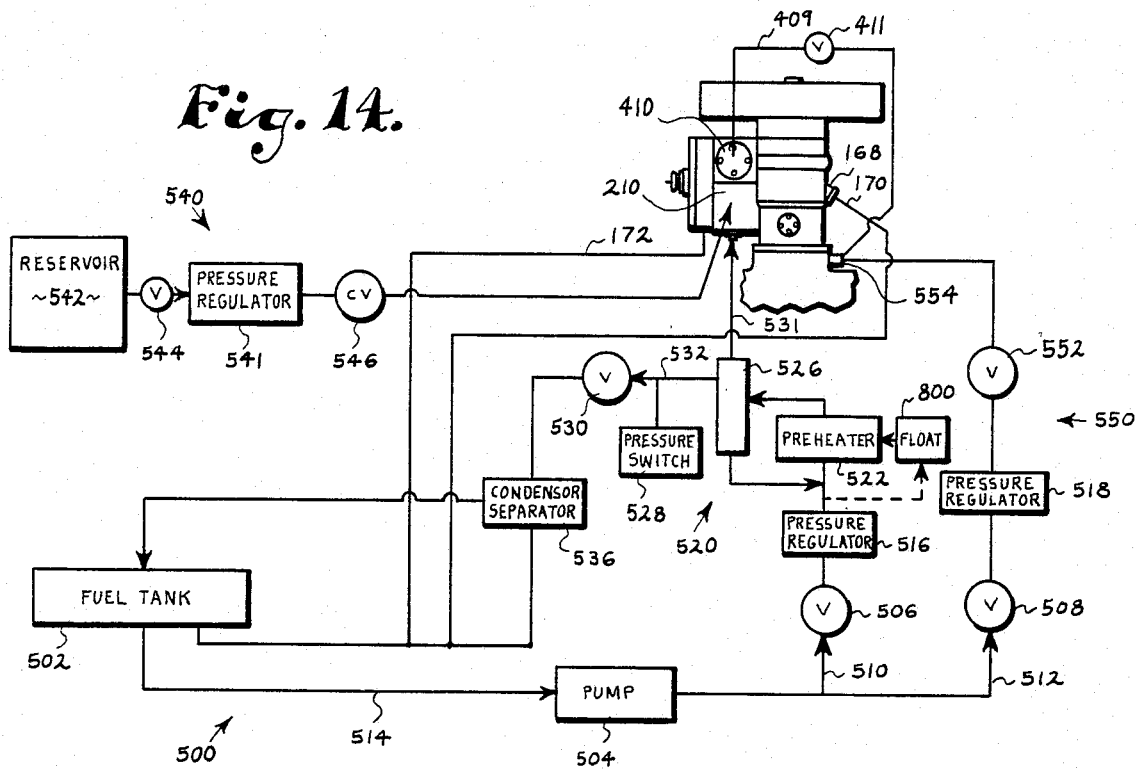
FIG. 14 is a diagrammatic view showing a fuel supply system, purge system and idle system associated with the molecular diffuser.
Figure 15:
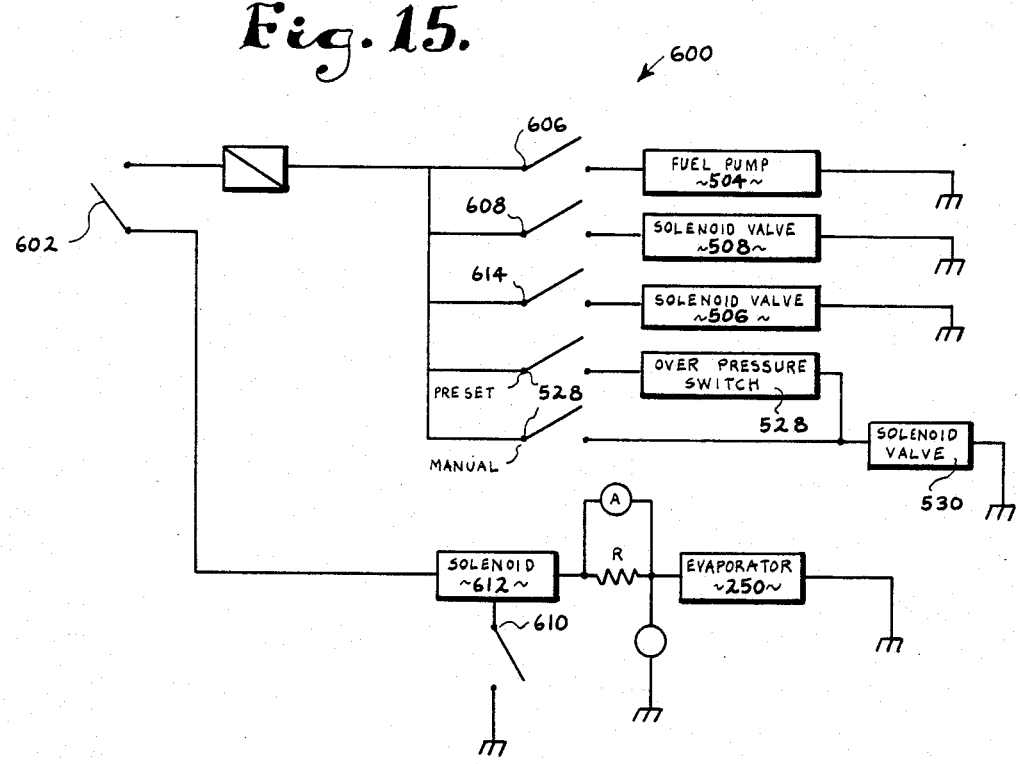
FIG. 15 is an electrical schematic view showing a plurality of switches and their association with the respective solenoid valves.

As diagrammatically shown in FIG. 14, a fuel supply system 500 is used to deliver the fuel to the molecular diffuser. The system comprises in the main a fuel tank 502, an electrical fuel pump 504, solenoid valves 506 508 and fuel lines 510 and 512. The system is operator controlled by a switching system 600 as shown in FIG. 15. Fuel in tank 502 is delivered to pump 504 via the fuel line 514. Pump 504 supplies fuel to the respective solenoid valves 506 and 508 and passes therethrough depending on their open or closed position. Solenoids 506 and 508 are used to control the flow of fuel to the pressure regulators 516 and 518 respectively associated with the vaporized fuel generation system 520 and raw fuel injection system 550. The vaporized fuel generation system 520 consists of the pressure regulator 516 and a fuel preheater 522, a liquid vapor/separator 526, an over pressure switch responsive to a selected pressure, a solenoid valve 530 associated with switch 528 and a fuel line 531 connected to the fuel inlet port 256 of the evaporator assembly. A float chamber 800 may also be associated with the pre-heater 522 so as to control the flow of fuel to the preheater 522 for ultimate control of a fuel to inlet port 256 as well as for a means of controlling the pressure of the fuel delivered thereto.

Fuel supplied through the solenoid valve 506 to the pressure regulator 516 is routed to the fuel preheater 522. As such, the fuel is preheated and evaporated therein so as to present a mixture of vapor and hot raw fuel to the vapor/separator 526. Therein, the vaporized fuel is separated from the liquid fuel with the liquid fuel returned by gravity to the preheater/evaporator 522 and the vaporized fuel routed to the evaporator assembly 250.

The raw fuel injection system 550 is used for engine startup and consists of solenoid 508, pressure regulator 518, and control valve 552, a fuel injector nozzle 554 with fuel line 512 therebetween. Fuel supplied by solenoid 508 is regulated to a correct pressure by regulator 518 and routed to the control valve 552. Control valve 552 establishes a proper flow of fuel to nozzle 554, as diagrammatically shown in FIG. 14, which is mixed with air drawn through an air bleed associated with the nozzle. Nozzle 554 is disposed within the idle system boss 560 located at the front of the main body section 100 and generally below throttle plate 120 so as to introduce a correct amount of fuel into the induction system for starting the internal combustion engine. Upon startup, the alternator (not shown) comes on line to enable the required current to be delivered to the heating elements 258, 259.

An idle vapor system line 409 is also connected to the nozzle 554 via a manually adjustable mixture valve 411 interposed in line 409 so as to inject vaporized fuel into the injection system. Line 409 is connected to the flow bypass port 410 which discharges vapor therefrom upon alignment with the flow bypass orifice 408 located in the rotary valve face 436.

Further associated with the fuel generation system is a fuel pressure system 575 consisting of an overpressure switch 528, a solenoid 530 and the vapor condensor/separator 536. The pressure switch 528 is responsive to pressures exceding 4 p.s.i. in the evaporator chamber 210 so as to close. Upon closing, switch 528 causes solenoid 530 to open which routes the overpressured vapor from the chamber 210 to the vapor condensor/separator 536 for condensation therein and return to tank 520. Low temperature vapors not condensed in 536 are routed to the fuel tank 520 for further condensation therein. This vapor condensor 536 is preferably mounted in front of the engine cooling radiator so as to provide for maximum air flow therearound, and thus increases condensor performance.

A purge system 540 is also diagrammatically shown in FIG. 14 and is used to blow down raw liquid from the molecular diffuser upon shutdown to return this liquid fuel to the vapor separator chamber 536. The system 540 consists of a purge reservoir 542 having nitrogen contained therein flowing through solenoid valve 544 connected to a pressure regulator 541. A check valve 546 between the regulator 541 and evaporator chamber 210 prevents back flow through the nitrogen line.

Upon engine shutdown, solenoid valve 544 allows the nitrogen to flow from the reservoir 542 to the pressure regulator to achieve a pressure of 1 p.s.i. The nitrogen is then injected into the molecular diffuser at the fuel evaporator chamber 210 to cause the liquid fuel to flush from the molecular diffuser and return to the vapor separator 526. As such, the purge system 540 inhibits any premixing of air and liquid fuel in the carburetor which may occur at engine startup as well as prevents a vacuum in the fuel lines flowing thereto due to a return of the vapor fuel to its liquid state upon engine shutdown.

OPERATION

The startup of the fuel supply system 500 is first described with a subsequent focus on the operation of the molecular diffuser assembly once supplied with the requisite fuel. Reference is made to the electrical system 600 which is diagrammatically shown in FIG. 15. The following is discussed in light of the molecular diffuser being used with an internal combustion engine mounted in a operator controlled vehicle.

Initially, the vehicle ignition switch 602 is turned to an on, noncranking position to allow current flow from the battery (not shown) to the electrical system 600. A purge switch (not shown) 604 is closed for approximately five seconds to activate the purge system 540 in order to remove vapors and liquid fuel from the fuel evaporator chamber 210 and the fuel line 531 extending therefrom. Upon blowdown any liquid fuel is returned to the vapor separator 526 for ultimate routing to the fuel tank 502.

Switch 606 is then turned on to energize the fuel pump 504, thus drawing the liquid fuel from the fuel tank 502 for delivery to the fuel supply system 500.

Ignition switch 602 is then engaged to crank the starter (not shown). Simultaneously, switch 608 is closed which causes the liquid fuel to flow to the idle system solenoid valve 508 which routes the liquid fuel to the raw fuel injection system 550 for injection of the liquid fuel from nozzle 554 into passageway 106 below the throttle plate 120 in order to bring the engine to an idle speed. It is noted that at this time the alternator (not shown) comes on line so as to perform its current producing function.

Subsequently, switch 610 is closed so as to activate a heater assembly solenoid valve 612, diagrammatically shown in FIG. 15, which monitors the flow of current to the plurality of thermistor heat elements 258, 259, such elements now drawing a sufficient amount of current so as to reach their preselected operating temperature.

Switch 614 is then turned on the cause the liquid fuel to flow through the solenoid valve 506 for flow to the pressure regulator 516. The determinately pressurized fuel is then routed to the preheater 522 either directly or through the optional float chamber 800.

Concurrently, mixture control valve 400 is rotated to the idle start position presenting an alignment of the flow bypass orifice 408 with the flow bypass port 410.

Vaporized fuel produced in the preheater assembly 522 is then routed to the liquid vapor separator chamber 526. The separated vapor is then routed through line 531 to the evaporator chamber 210 for heating therein as to be subsequently discussed. Condensate formed in the separator chamber 526 is discharged therefrom via line 532. Vapor produced within the evaporator chamber 210 is delivered to the regulator assembly 300 for routing to the vapor flow canal 206 with mixture control valve 400 interposed therein. A reduction of engine rpm's indicates that vapor is being passed through the mixture control valve 400 and into the passageway 106 via the flow bypass system 407. At this time system 550 may be shut down as the engine can operate on the vaporized fuel. The mixture control valve 400 is then adjusted to present the opening 438 allowing for flow of fuel through the valve 400 and into the passageway 106 at the venturi throat 152. The operator may then further adjust the attitude of the opening 438 relative to the vapor flow channel 206 to provide for a smoother operation of the engine.

Referring more particularly to the function of the molecular diffuser, it is understood that the above-described fuel supply system 500 is not to be considered as a limitation to the scope of the instant invention. Accordingly, a focus of operation of the diffuser is now taken assuming that a liquid fuel has been introduced thereto irrespective of the fuel supply system associated therewith.

Upon passage of the fuel into the fuel evaporator chamber 210 through the fitting/inlet port 256, the fuel enters the boiler chamber 264 which is an area enclosed by the top surface of the base plate 252, support structure 254 and bottom surface of the first thermistor heat element 258. As noted, the thermistor elements 258, 259 are at a selected operating temperature, in this case, 395° F. As the fuel level rises in the boiler 264, it impinges on the bottom surface of heat element 258 to commence boiling.

The moist fuel vapors that occur from such initial boiling rise into the center chamber which is superheated by the thermistor heat elements 259 so as to be converted to a dry and substantially complete gas vapor. It is understood that available fuels have a number of constitutents therein all having boiling points of different temperatures. Thus, it is desirable to have the elements 258, 259 to operate at the temperature of the highest boiling point of a constituent so that total evaporation occurs. Accordingly, the temperature of 395° F. has been found to be the highest boiling point of constituent found in the fuel, and assures a substantially complete and dry vapor.

Above the stack of thermistor heat elements 259 is a dome chamber 268 in which the superheated fuel vapors collect. Extending from the dome chamber 268 is the vapor dome channel 270 having the throttling valve 332 at one end thereof.

It is pointed out that condensate which may form in the dome chamber 268 will fall back to the superheated chamber 266 or boiler 264 for subsequent heating and return to the dome 268.

It is also noted that the expansion ratio for fuel is approximately 200 to 1 so that the pressure can rise rapidly in the evaporator chamber 210. Accordingly, if the demand for the vaporized fuel from the dome chamber 268 is low, it can be appreciated that there is a possibility of a significant pressure buildup within the evaporator chamber 210 which must be addressed. Therefore, as shown in the system of FIG. 14, an overpressure switch 528 and solenoid valve 530 have been interposed into a portion of the fuel line. Upon a pressure buildup in the evaporator chamber 210, the superpressurized vapor will back up along the fuel line as it is greater than the pressure of the incoming fuel. This pressure causes the overpressure switch 528 to actuate solenoid valve 530 allowing for the pressurized vapor to pass therethrough. As shown in FIG. 14, the vapor is routed to a vapor condensor 536 for condensation therein and subsequent return to the fuel tank 502.

As fuel vapor is drawn from the dome chamber 268, the pressure drop in the evaporator chamber 210 causes the fluid level in the boiler 264 to rise so as to continue the evaporation cycle. Accordingly, this provides for a smooth continuous flow of superheated fuel to the rest of the molecular diffuser.

In the normal operation of the internal combustion engine, as operator controlled, a vacuum is created at the intake manifold which is used to draw air through the inlet end 102 of the passageway 106 for mixture of fuel concurrently injected therein. Changes in fuel demand by the engine correspond to changes in the rate of flow of air and fuel through the passageway such rate being called the mass flow rate. The throttle plate 120 as above discussed, has been interposed in the passageway 106 so as to provide for a more direct control of this mass flow rate through passageway 106.

Thus, it can be appreciated that the change in the mass flow is a proper parameter to consider in deciding the amount of vaporized fuel to be delivered for diffusion into the airstream. Accordingly, the regulator assembly 300 acts in response to parameters associated with the mass flow rate so as to variously throttle the vaporized fuel from channel 270 for flow towards the venturi 150 so as to meed this engine demand. Means for deriving such parametric information is thus provided.

As the air is drawn through passageway 106, a sample of the air at a static pressure at the inlet end 102 is channeled through the inlet pressure conduit 208 for delivery into the static pressure chamber 320. This inlet static pressure is used as a basic reference pressure.

Concurrently, a pressure drop of the airstream occurs at the constricted throat 152 of the venturi 150. Such a pressure drop is communicated to the dynamic pressure chamber 314 via the vapor flow channel 206. Thus, the pressure drop between the inlet end 102 and venturi throat 152 which is indicative of a change in velocity of an air stream passing through the venturi is communicated to the chambers 314 and 320 with the diaphragm lying therebetween. The diaphragm 312 being sensitive to a pressure differential moves to the chamber of lesser pressure (314 at this instant) and thus unseats the valve 332 allowing for a vapor flow from channel 270 into the dynamic pressure chamber 314. Subsequently, the vapor flow from this dynamic pressure chamber 314 into the vapor flow channel 206 for passage through the mixture control valve 400 and into the annular venturi channel 162 encompassing the venturi throat 152. Slots 154 communicate the venturi throat 152 with the venturi channel 162 allowing for an even disbursement of the fuel mixture into the air mass flow. Once disbursed into the airstream, the vaporized fuel readily diffuses with the airstream as the gaseous state of the fuel represents molecules at the greatest degree of separation so as to provide the greatest opportunity for mixture with the airstream. It is important to note that the introduction of the fuel vapor into the airstream 106 occurs above the throttle plate 120. Accordingly, changes in the flow rate of that portion of the airstream actually combined with the vapor fuel is provided to the regulator assembly 300.

Successive changes in the mass flow rate will cause changes in the pressure drop of the mass flow at the venturi throat 152 which is communicated to the dynamic pressure chamber 314. A reduction in demand of the vapor flow will cause a pressure buildup due to the fuel vapor contained within this chamber 314. Such a pressure increase will cause the diaphragm 312 to move towards the static pressure chamber 320 so as to close the valve and thus decrease the rate of vapor flow. At a continuous selected mass flow rate through the venturi 150, the diaphragm 312 will stabilize in a position allowing for the demanded quantity of fuel vapor to be delivered to the venturi 150.

It is also noted that the pressure drop occurring at the mixture control valve 400 when aligned with the channel 206 very nearly equals the pressure drop generated by the venturi 152. Accordingly, a change of the mixture control valve 400 from a position of perfect alignment will increase the pressure in the vapor flow channel 206 which is communicated to the chamber 314. This reduction from the basic reference pressure, as created by the venturi, and offset by the increase of pressure in channel 206 as created by the mixture control valve setting is communicated to chamber 314 which positions the diaphragm 312 in reference to the base pressure in the static pressure chamber 320. Therefore, it can be seen that the demand for fuel vapor is established by the mass flow rate through the passageway 106 as presented at the mouth of the venturi 152 therein.

As shown in FIGS. 16 and 17, a float chamber assembly 800 may be mounted to the molecular diffuser in communication with the evaporator chamber 210 to provide a delivery of raw liquid fuel to the boiler chamber 264 therein in accordance with the mass flow rate of the mixture as demanded by the internal combustion engine.

As shown, the float chamber assembly 800 includes a housing 801 with chamber 802 and float 804 therein. A fuel inlet port 806 provides for entry of the liquid fuel from the fuel tank 502 into the chamber 802 as controlled by a needle valve 808 which is operated by the float 804. A horizontally disposed channel 810 extends from the float chamber 802 and is in communication with the evaporator chamber 210. The float 804 is designed to maintain the level of the fuel flowing therethrough so as to provide for a continuous fuel impingement on the first thermistor element 258. About the bottom of the annular support structure 254 is drilled a series of apertures 812 therethrough providing for a means of venting the boiler chamber 264. A drain plug 814 located at the chamber 802 bottom is also employed and can be used to flush the chamber 807 for cleaning or the like.

Accordingly, the float chamber assembly 800 delivers the liquid fuel to the boiler chamber 264 at a rate depending on the rate of discharge of the vaporized fuel from the upper regions of the evaporator chamber 210. As described, such rate is dependent upon the rate of the fuel demand by the associated internal combustion engine which causes operation of the regulator assembly 300 and movement of the throttling valve 332. Thus, a correspondence between the mass flow rate of the airstream through passageway 106 and the rate of flow of liquid fuel into the boiler chamber 264 is established. The use of the float chamber assembly precludes the use of the solenoid valve 506, pressure regulator 516, and if desired, the preheater assembly 522. The preheater assembly 522 can be used, if desired, to reduce the thermal load on the thermistorheating elements 258, 259. Furthermore, the use of the float chamber assembly 800 reduces the possibility of flooding in the evaporator chamber 210; provides a means of adjusting the existing pressure differential between the fuel pump 504 pressure and evaporator chamber 210 pressure; and, as above pointed out, provides for a rate of fuel flow to the evaporator 210 to meet the production requirements of vaporized fuel therein as determined by the mass flow rate of the fuel/air mixture into the associated internal combustion engine. Also, the float chamber 800 can be used to displace the fuel from the first thermistor element 258 to stop the boiling process. This is especially desired upon engine shutdown to prevent further vaporization of the liquid fuel.

As diagrammatically shown in FIG. 18, a demand pressure regulator 700 similar in construction to the fuel pressure regulator assembly 300 is interposed in an idle vapor flow line 712 extending between a fitting 722 communicating with the dome 268 of the evaporator chamber 210 and the nozzle 554. The system 700 is used for engine startup and idle on vaporized fuel and, as such, can be used in lieu of the raw fuel injection system 550 and flow bypass system 407. Systems 550 and 700 may be alternatively employed if desired especially in cold weather climates.

The system 700 consists of a housing 702 having a diaphragm 704 therein presenting first 706 and second 708 chambers on the opposed sides thereof. Line 710 extending from chamber 706 is in communication with the inlet pressure conduit 208. Chamber 708 is in communication with the molecular diffuser through nozzle 554 at a point below the throttle plate 120 as provided by the vapor flow line 712. A mixture control valve 714 is interposed in line 712 after the demand pressure regulator 700.

Fitting 722 allows for a flow of vaporized fuel therethrough, either to the pressure regulator assembly 300 or to the demand pressure regulator 700 via line 718. It is understood that a T-fitting may be positioned within the molecular diffuser and in communication with the dome chamber 268 to provide for the desired path diversion.

At engine startup current is supplied to the thermistor elements 258 and 259. Raw fuel is routed directly to the evaporator chamber 210 through the fuel supply system 500 for vaporization therein. The vaporized fuel presented therein flows along a path determined by the operation of the separate pressure regulators 300 and 700, with the respective valves 332 and 720 associated therewith initially being at a closed position. At startup, chamber 706 is at a greater pressure relative to the low intake manifold pressure below throttle plate 120 as communicated to chamber 708. This differential causes the diaphragm 704 to accordingly shift and displace the valve 720 from the closed position. As throttle plate 120 is at a transverse blocking position within the passageway 106, the pressure differential in chambers 320 and 314 is relatively equal preventing flow of the vaporized fuel therethrough through the alternate path. Upon valve 720 opening the vaporized fuel flows through line 718 into chamber 708 and then through line 712 for injection into the molecular diffuser below the throttle plate 120.

After a sufficient flow of the vaporized fuel into the molecular diffuser which can be indicated to the operator by an overpressure switch interposed in line 712 or the like, the ignition switch 602 is engaged to crank the starter (not shown), thus causing an ignition of the vapor so as to start the associated internal combustion engine. Upon starting, throttle plate 120 is moved from its transverse blocking position which creates the pressure differential in chambers 320 and 314 as above described so as to operate the associated regulator assembly 300. Thus, vaporized fuel from the evaporator chamber 210 is routed through the molecular diffuser proper via the vapor dome channel 270 rather than to line 718. Accordingly, the flow of the vaporized fuel from chamber 708 to line 712 is diminished causing a pressure increase in chamber 708 which shifts the diaphragm 704 towards chamber 706 closing the valve 720. Diaphragm 704 may be spring biased to this closure position if so desired. Mixture control valve 714 interposed in line 712 is adjustable by the operator to provide for a smooth engine idle during this engine startup.

Although the above discussed carburetor is the preferred embodiment of the molecular diffuser assembly, the invention is not intended to be restricted to this use. The invention, as above described, can be used as a molecular diffuser in any environment which requires the mixing of a first evaporable liquid with a reacting gas.

Having then described the invention, what is claimed as new and desired to be secured by Letters Patent is:

1. Apparatus for delivering a fuel/air mixture to the induction system of a combustion chamber, said apparatus comprising:
    structure presenting a passageway adapted for communication with said induction system and having an air-receiving inlet;
    means for deriving information indicative of the mass flow rate of an airstream drawn through said passageway by said induction system upon demand therefor by said combustion chamber;
    evaporator means for vaporizing liquid fuel supplied thereto;
    conduit means extending from said evaporator means and including a first channel surrounding said passageway;
    means for communicating said vaporized fuel disposed about said first channel to the interior of said passageway and at a region adjacent said inlet for introducing said vaporized fuel from a plurality of points about the exterior of said passageway and into said airstream for a dispersed diffusion of said vaporized fuel to provide said fuel/air mixture;
    regulator means interposed in said conduit means and responsive to the mass flow rate information from said deriving means for controlling a flow of said vaporized fuel from said conduit means into the airstream in accordance with said demand;
    a slot downwardly extending from said first channel;
    a second channel extending about the exterior of said passageway structure and isolated therefrom, said second channel communicating with said slot at a position below said first channel; and
    a discharge line extending from said second channel for returning said condensate to a supply of said liquid fuel whereby condensate of said vaporized fuel along the extent of said first channel is directed into second channel by said slot and away from said vaporized fuel entering said first channel to generally preclude delivery of said condensate into said interior of said passageway and said downstream induction system.

2. The apparatus as claimed in claim 1 further comprising a second condensate line in communication with said evaporator means whereby to return condensate forming in said evaporator means to said supply of liquid fuel.

3. The apparatus as claimed in claim 2 further comprising a third condensate line in communication with said conduit means at a point between said evaporator means and said first channel whereby to return condensate forming downstream of said evaporator means and upstream of said first channel to said supply of liquid fuel.

4. Apparatus for delivering a fuel/air mixture to the induction system of a combustion chamber, said apparatus comprising;
    structure presenting a passageway adapted for communication with said induction system and having an air-receiving inlet;
    means for deriving information indicative of the mass flow rate of an airstream drawn through said passageway by said induction system upon demand therefor by said combustion chamber;
    evaporator means for vaporizing liquid fuel supplied thereto;
    conduit means extending from said evaporator means and communicating with said passageway at a region thereof adjacent said inlet for introducing vaporized fuel into said airstream for diffusion of the same to provide said fuel/air mixture;
    regulator means interposed in said conduit means and responsive to the mass flow rate information from said deriving means for controlling a flow of said vaporized fuel from said conduit means into the airstream in accordance with said demand;
    a valve body;
    means for defining a port through said valve body as presented by first and second valve members having channels in a preferred alignment therebetween;
    means for relatively moving said channels of said valve members from said preferrably aligned position whereby to adjust the size of said port through said valve body from said preferred position;
    means for positioning said valve body in said conduit means for flow of said vaporized fuel therethrough in an amount corresponding to said size of said port; and
    a first means for controlling said relative movement of at least one of said valve members in response to changes in the ambient air pressure surrounding said combustion chamber whereby said movement of said at least one valve member adjusts the size of said port formed by said first and second valve members.

5. The apparatus as claimed in claim 4 further comprising:
    a second means for controlling said relative movement of at least one of said valve members in response to changes in pressure in said induction system whereby to adjust the size of said port formed by said first and second valve members.

6. The apparatus as claimed in claim 5 wherein said first means comprises:
    an aneroid including a chamber with a pressure responsive member therein;
    means for communicating said chamber with said ambient air;
    means for linking said aneroid to said at least one valve member whereupon changes in said ambient air pressure causes said aneroid to move in a first direction upon increases in pressure in said chamber and in an opposite direction upon decreases in pressure in said chamber, whereby to provide said movement of at least said one linked valve member towards and away from said position of preferred alignment.

7. The apparatus as claimed in claim 5 wherein said second means comprises:

an aneroid including a chamber with a pressure responsive member therein;

means for communicating said chamber to the pressure in said manifold system;

means for linking said aneroid to said at least one valve member whereupon changes in said manifold pressure causes said aneroid to move in a first direction upon increases in said chamber pressure and in an opposite direction upon decreases in said chamber pressure whereby to provide said movement of at least said one linked valve member towards and away from said position of preferred alignment.

8. In an internal combustion engine having a manifold, a venturi, a source of fuel, a first flow passage for fuel leading from the source of fuel to said venturi, and a second flow passage in fluid communication with the ambient air and said manifold, said second flow passage passing through said venturi, and a mixture control valve for regulating the flow of fuel along said first flow passage between said source of fuel and said venturi, said mixture control valve comprising:

a valve body, means for defining a port through said valve body, said port defining means includes first and second members and means for mounting each of said members for movement relative to each other and said valve body, said first and second members having respective channels therethrough collectively defining said port wherein relative movement of said first and second members progressively adjusts the size of the port by aligning and progressively misaligning said channels, means for positioning said valve body in said fuel flow passage with said fuel flowing through said port, first means for automatically adjusting the size of said port in response to changes in the ambient air pressure adjacent the engine, and, second means for automatically adjusting the size of said port in reponse to changes in the manifold pressure of said engine.

9. The mixture control valve of claim 8 wherein said mounting means mounts said first and second members for movement along a first axis relative to each other and said valve body, said first means includes means for selectively moving said first member along said first axis in one direction in response to increases in the ambient air pressure surrounding the engine and a second direction in response to decreases, and said second means includes means for selectively moving said second member along said first axis in one direction in response to increases in the manifold pressure of the engine and a second direction in response to decreases whereby the size of the port is automatically and progressively adjusted as said first and second members are moved to align and progressively misalign said channels.

10. The mixture control valve of claim 9 wherein said moving means of said first means includes an aneroid having a flexible, hollow member at a first pressure surrounded by a chamber member vented to the ambient air adjacent the engine whereby increases in the ambient air pressure causes said flexible member to contract and move said first member in said one direction and decreases cause said flexible member to expand and move said first member in said second direction and wherein said moving means of said second means includes an aneroid having a flexible, hollow member at a first pressure surrounded by a chamber vented to the manifold of said engine whereby increases in the manifold pressure cause said flexible member to expand and move said second member in said one direction and decreases cause said flexible member to contract and move said second member in said second direction.

11. The mixture control valve of claim 8 further including means for restricting the movement of said first and second members relative to each other along a first axis and means for mounting said first and second members for rotational movement together about said first axis relative to said valve body between a first position permitting flow through said port and a second position precluding flow through said port.

12. The mixture control valve of claim 8 wherein said port defining means includes said first and second members and means for mounting each of said members for movement along a first axis relative to each other and said valve body, said first member having a main channel therethrough, said main channel having first and second end portions with respective first and second cross-sectional shapes, said second member being hollow and extending along said first axis, said second member being concentrically mounted about said first member in sliding engagement therewith, means for restricting movement of said first and second members relative to each other to along said first axis, said first and second end portions of said main channel of said first member being spaced a first distance from each other about said first axis, said hollow second member having first and second channels therethrough spaced from each other about said first axis a distance substantially equal to said first distance and having respective cross-sectional shapes substantially corresponding to the shapes of said first and second end portions of said main channel said first means including means for selectively moving said first member along said first axis in one direction in response to increases in the ambient air pressure adjacent the engine and a second direction in response to decreases, said second means including means for selectively moving said second member along said first axis in one direction in response to increases in the manifold pressure of the engine and a second direction in resonse to decreases, whereby the size of the port is automatically and progressively adjusted as said first and second members are moved to align and progressively misalign the first and second end portions of the main channel of the first member and the first and second channels of the second member.

* * * * *